(12) United States Patent
Kojima et al.

(10) Patent No.: US 6,452,947 B1
(45) Date of Patent: Sep. 17, 2002

(54) INFORMATION RETRIEVAL SYSTEM AND INFORMATION TERMINAL USED IN THE SAME, AND RECORDING MEDIUM

(75) Inventors: Hideki Kojima; Shinta Kimura, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/109,905

(22) Filed: Jul. 2, 1998

(30) Foreign Application Priority Data

Feb. 16, 1998 (JP) .......................................... 10-033015

(51) Int. Cl.[7] .................................................. H04J 1/02
(52) U.S. Cl. ....................................... 370/493; 370/271
(58) Field of Search .............................. 379/93.23, 101, 379/220, 88.14, 67; 709/217, 218, 246; 455/406, 461, 414; 707/501, 3, 522; 370/392, 493, 271; 345/1, 747, 302; 705/14; 725/100

(56) References Cited

U.S. PATENT DOCUMENTS

| | | | | |
|---|---|---|---|---|
| 5,721,827 A | * | 2/1998 | Logan et al. ................ 709/217 |
| 5,742,905 A | * | 4/1998 | Pepe et al. .................. 455/461 |
| 5,802,314 A | * | 9/1998 | Tullis et al. ................ 709/246 |
| 5,825,854 A | * | 10/1998 | Larson et al. | |
| 5,864,823 A | * | 1/1999 | Levitan ....................... 705/14 |
| 5,991,799 A | * | 11/1999 | Yen et al. ................... 709/218 |
| 6,091,411 A | * | 7/2000 | Straub et al. ............... 345/747 |

FOREIGN PATENT DOCUMENTS

JP  09081447  3/1997

OTHER PUBLICATIONS

Kobayashi, Syun–chi et al., "A Development of High–quality Japanese Text–to–Speech System", Proceedings of the 49th National Convention of the Informtion Processing Society (1994), with full English language translation.
Katae, Nobuyuki et al., "High–Quality Japanese Text–to–Speech System: Narsys", ESCA. Eurospeech '95.4* European Conference on Speech Communication and Technology, Madrid, Sep. 1995, pp. 1861–1864.

* cited by examiner

*Primary Examiner*—Hassan Kizou
*Assistant Examiner*—John Pezzlo
(74) *Attorney, Agent, or Firm*—Staas & Halsey LLP

(57) ABSTRACT

The present invention provides an information speech system that can reduce the time that the user waits for connection to the network in a so called mobile environment. Menu information is transmitted from an information station to a mobile terminal by utilizing text broadcasting, so that the number of times of connection of the mobile terminal to the network can be reduced.

11 Claims, 29 Drawing Sheets

INFORMATION RETRIEVAL SYSTEM AND INFORMATION TERMINAL USED IN THE SAME, AND RECORDING MEDIUM

BACKGROUND OF THE INVENTION

1. Field of the Invention

The present invention relates to an information speech system for outputting information downloaded from a remote information station in a so-called mobile environment as speech.

2. Description of the Related Art

A system called "MONET" produced by TOYOTA MEDIA STATION is used in the mobile environment where a mobile information terminal, such as a personal digital assistant (hereinafter referred to as "PDA"), is used. In this system, the user selects desired information from a menu screen. Then, the system downloads the selected information from a remote information station, and outputs speech in a PDA. In this system, information necessary to display a menu (hereinafter referred to as "menu information") is first downloaded from the information station via a network by using a cellular phone or a personal handyphone system (hereinafter referred to as "PHS"), and then the information selected by the user is downloaded.

However, this system has to connect with the network in order to download menu information. A certain period is required until the system is connected to the network with a cellular phone or a PHS, so that the user waits during that period. For the purpose of reducing communication costs, the system may be disconnected from the network after the menu information is downloaded. When the information to be downloaded is selected, the system is connected to the network again. Again, the user waits for the system to be connected to the network. In this manner, the user waits every connection.

SUMMARY OF THE INVENTION

Therefore, with the foregoing in mind, it is an object of the present invention to provide an information speech system that can reduce a waiting time of a user in a so-called mobile environment.

An information speech system of present invention includes an information terminal and a remote information station. In the information terminal, information to be obtained is selected among information stored in the remote information station and the obtained information is output as speech. The information station comprises broadcasting means for broadcasting menu information necessary to select information at the information terminal, a communication receiver for receiving communication including data corresponding to selected information from the information terminal, and an information transmitter for transmitting the selected information based on the data received by the communication receiver. The information terminal comprises a broadcast receiver for receiving broadcasting transmitted by the broadcasting means, an information selector for allowing a user to select information to be obtained by using the menu information included in the broadcasting, a communicator for communicating data corresponding to the selected information to the information station, an information receiver for receiving the information transmitted by the information transmitter, and speech outputting means for outputting the information received by the information receiver as speech.

Since menu information is transmitted to an information terminal by utilizing broadcasting in this embodiment, the time that the user waits for connection to the communication means can be reduced, compared to transmitting the menu information by utilizing radio communication with a cellular phone or a PHS.

In one embodiment of the information speech system of the present invention, the information station comprises a converter for converting information from character strings to phonetic character strings for outputting the character strings as speech. The information is stored in the information station in the form of phonetic character strings. The information transmitter transmits the information in the form of phonetic character strings. The speech outputting means in the information terminal converts the phonetic character strings to speech.

In order to output character string information as speech in an information terminal, it is necessary to convert the character string information to information representing speech (phonetic character string) to be output. In order to convert the character string information to the phonetic character string precisely, a variety of dictionary data are required. The embodiment as described above eliminates the necessity of storing an enormous amount of dictionary data in each information terminal and facilitates the maintenance of dictionary data.

In another embodiment of the information speech system of the present invention, the broadcasting means transmits the information including an identifier representing each information, character string information for displaying contents of each information on a menu, and character string information of an initial part of each information. The information terminal comprises an initial part storage for storing the character string information of the initial part of each information. The speech outputting means outputs the character string information stored in the initial part storage as speech, prior to reception of information of a part that is not stored in the initial part storage from the information station.

This embodiment makes it possible to output the initial part of the information as speech during a process of connecting to the communication means, so that the time that the user waits can be further reduced.

In still another embodiment of the information speech system of the present invention, the information station comprises a converter for converting information character strings to phonetic character strings for outputting the character strings as speech. The information is stored in the information station in the form of phonetic character strings. The broadcasting means transmits the character string information of the initial part in the form of phonetic character strings. The information transmitter transmits the information in the form of phonetic character strings. The speech outputting means in the information terminal converts the phonetic character strings to speech.

According to another aspect of the present invention, an information terminal for use in an information speech system including an information terminal and a remote information station, the information terminal selecting information to be obtained among information stored in the remote information station and outputting the obtained information as speech, comprises broadcast receiver for receiving broadcasting including menu information necessary to select information transmitted from the information station, an information selector for allowing a user to select information to be obtained by using the menu information included in the broadcasting, a communicator for communicating data corresponding to the selected information to the information station, an information receiver for receiving information transmitted from the information station based on the data communicated by the communicator, and speech outputting means for outputting the information received by the information receiver as speech.

According to still another aspect of the present invention, a computer-readable recording medium storing a program realizing an information terminal is provided. The terminal is used in an information speech system including an information terminal and a remote information station. In the information terminal, information to be obtained is selected among information stored in the remote information station and the obtained information is output as speech. The program comprises the steps of displaying menu information necessary to select information included in broadcasting transmitted from the information station, receiving a selection of information to be obtained from a user, communicating data corresponding to the selected information to the information station, receiving information transmitted from the information station based on the data communicated during the communicating step, and outputting the information received at the information receiving step as speech. For example, this is especially effective when an information terminal for general purposes is used.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of embodiments with reference to the accompanying drawings.

Figure 1:
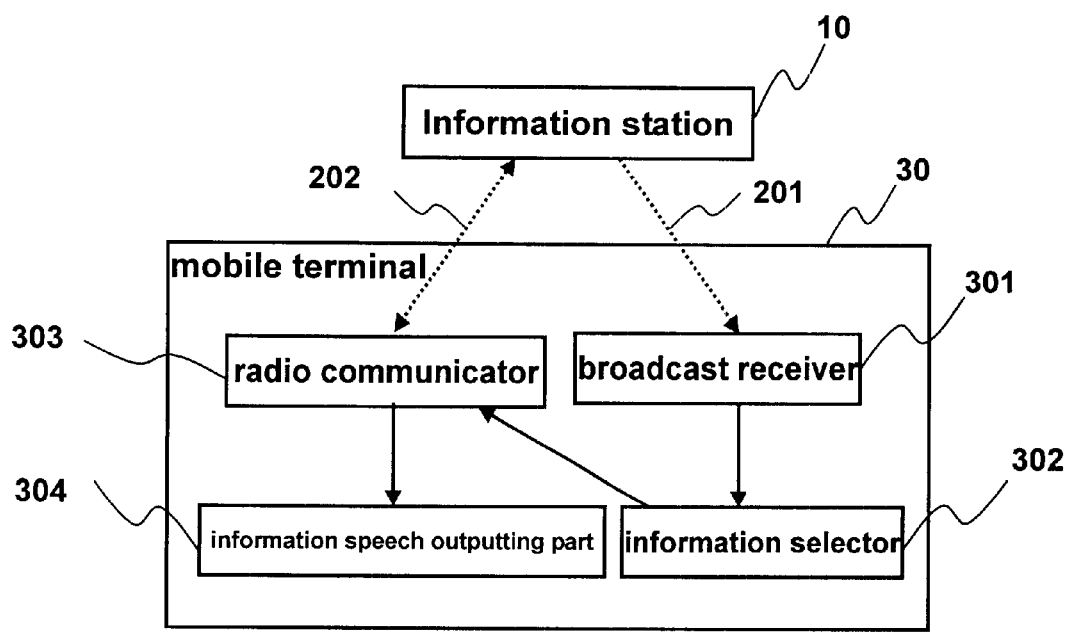
FIG. 1 is a diagram showing the basic structure of an information speech system of the present invention.

First, the basic structure of the information speech system of the present invention will be described. FIG. 1 is a diagram illustrating the basic structure of the information speech system of the present invention.

As shown in FIG. 1, the information speech system of the present invention is realized between an information station 10 for accumulating character information and a mobile terminal 30 such as a PDA. The present invention is described by taking character information as an example in this specification. However, the present invention can be applied to other information, for example sound information representing music.

A TV or radio broadcasting station can be utilized as the information station 10. The information station 10 broadcasts information including information necessary to display a menu for selection of character information (hereinafter, information included in the broadcast is referred to as "menu information") to the mobile terminal 30, for example, by text broadcasting. An identifier (hereinafter, referred to as "ID") corresponding to each information or a relatively short character string that is displayed in a menu (hereinafter, referred to as "menu character string") can be included as the menu information. A variety of other information or forms also can be used, as described later. A broken line 201 in FIG. 1 denotes radio waves used in the broadcasting.

The mobile terminal 30 basically includes a broadcast receiver 301, an information selector 302, a radio communicator 303, and an information speech outputting part 304.

The broadcast receiver 301 receives broadcasting radio waves and transmits menu information to the information selector 302.

The information selector 302 displays menu character strings on an output device such as a liquid crystal display, based on the menu information, so that the user can select information that the user desires to download. The output device is not necessarily a liquid crystal display, but any device can be used that allows the user to select information that the user desires to download.

The radio communicator 303 such as a cellular phone or a PHS establishes radio communication so as to download the information selected by the user from the information station 10. A broken line 202 in FIG. 1 denotes radio waves in the radio communication.

The information speech outputting part 304 outputs the obtained information as speech. The function of the information speech outputting part 304 depends on the form of the information obtained from the information station 10 via the radio communicator 303. When information is transmitted from the information station 10 in the form of character string information, software for speech synthesis, for example, can be used.

The information speech system having the basic structure described above will be described more specifically by way of a variety of embodiments below.

Embodiment 1

A first embodiment of the present invention will be described below.

Figure 2:
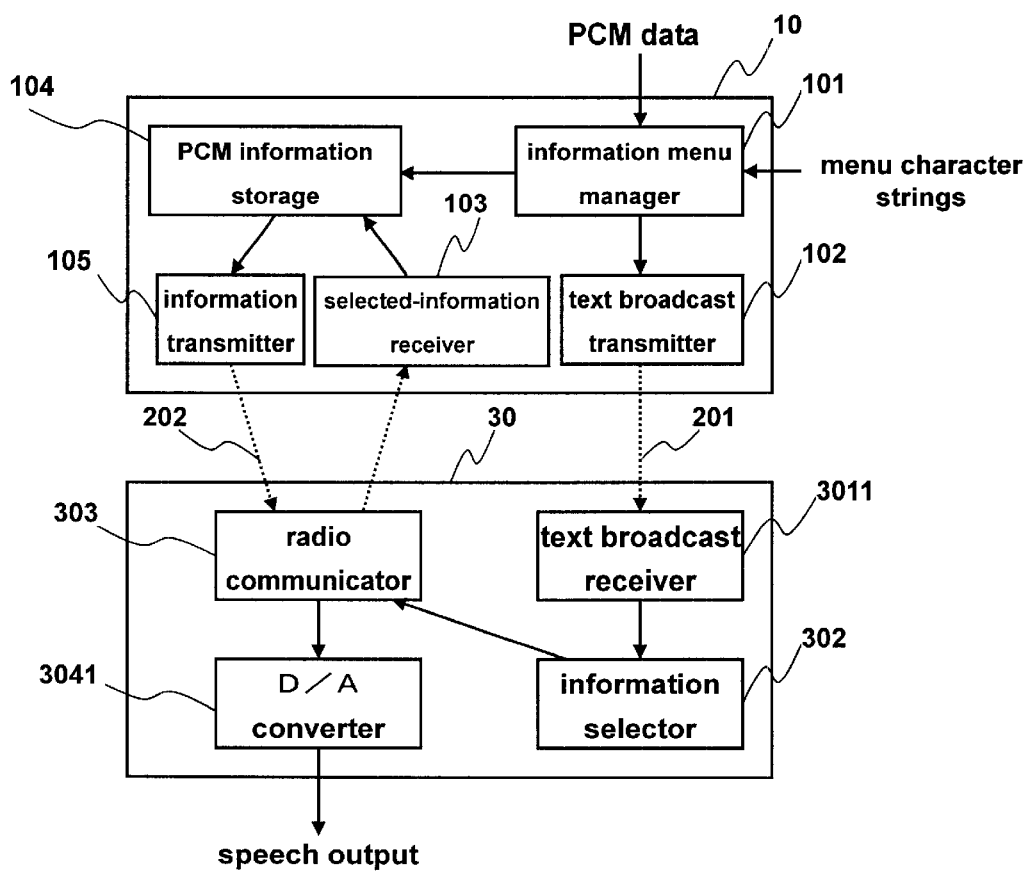
FIG. 2 is a block diagram showing the structure of an information speech system according to Embodiment 1 of the present invention.

FIG. 2 is a block diagram showing the structure of an information speech system according to Embodiment 1 of the present invention. As shown in FIG. 2, the information speech system in Embodiment 1 includes an information menu manager 101, a text broadcast transmitter 102, a selected-information receiver 103, a pulse code modulation (hereinafter referred to as "PCM") information storage 104 and an information transmitter 105 on the side of the information station 10.

The information menu manager 101 manages information and menu information stored in the information station 10. More specifically, the information menu manager 101 obtains external PCM data representing speech based on character information and menu character strings, assigns an ID to each PCM data and transmits the PCM data to the PCM information storage 104. At the same time, the information menu manager 101 transmits the menu character strings and the IDs to the text broadcast transmitter 102 to transmit constantly via text broadcasting.

The text broadcast transmitter 102 transmits the menu character strings and the IDs of the PCM data constantly by utilizing text broadcasting.

The selected-information receiver 103 receives the ID of the information that the user selects from the menu via radio communication with a cellular phone or a PHS.

The PCM information storage 104 stores the PCM data of information provided with an ID as described above. The PCM information storage 104 transmits the PCM data to be transmitted to the user to the information transmitter 105, based on the ID received by the selected-information receiver 103.

The information transmitter 105 transmits the PCM data obtained from the PCM information storage 104 to the user via radio communication.

On the other hand, the mobile terminal 30 in Embodiment 1 includes a text broadcast receiver 3011, an information selector 302, a radio communicator 303, and a D/A converter 3041. Since the menu is transmitted by TV or radio text broadcasting and information for output as speech is stored on the side of the information station 10 as PCM data in this embodiment, the mobile terminal 30 includes the text broadcast receiver 3011 and the D/A converter 3041.

The text broadcast receiver 3011 receives text broadcasting that is broadcast constantly from the information station 10 and transmits a menu character string and the ID of information for each menu character string to the information selector 302.

The functions of the information selector 302 and the radio communicator 303 are not further described because they have been described as components of the basic structure.

The D/A converter 3041 converts the PCM data transmitted from the information station 10 via radio communication from digital signals to analog signals. The D/A converter 3041 outputs information represented by analog signals as speech.

Figure 3:
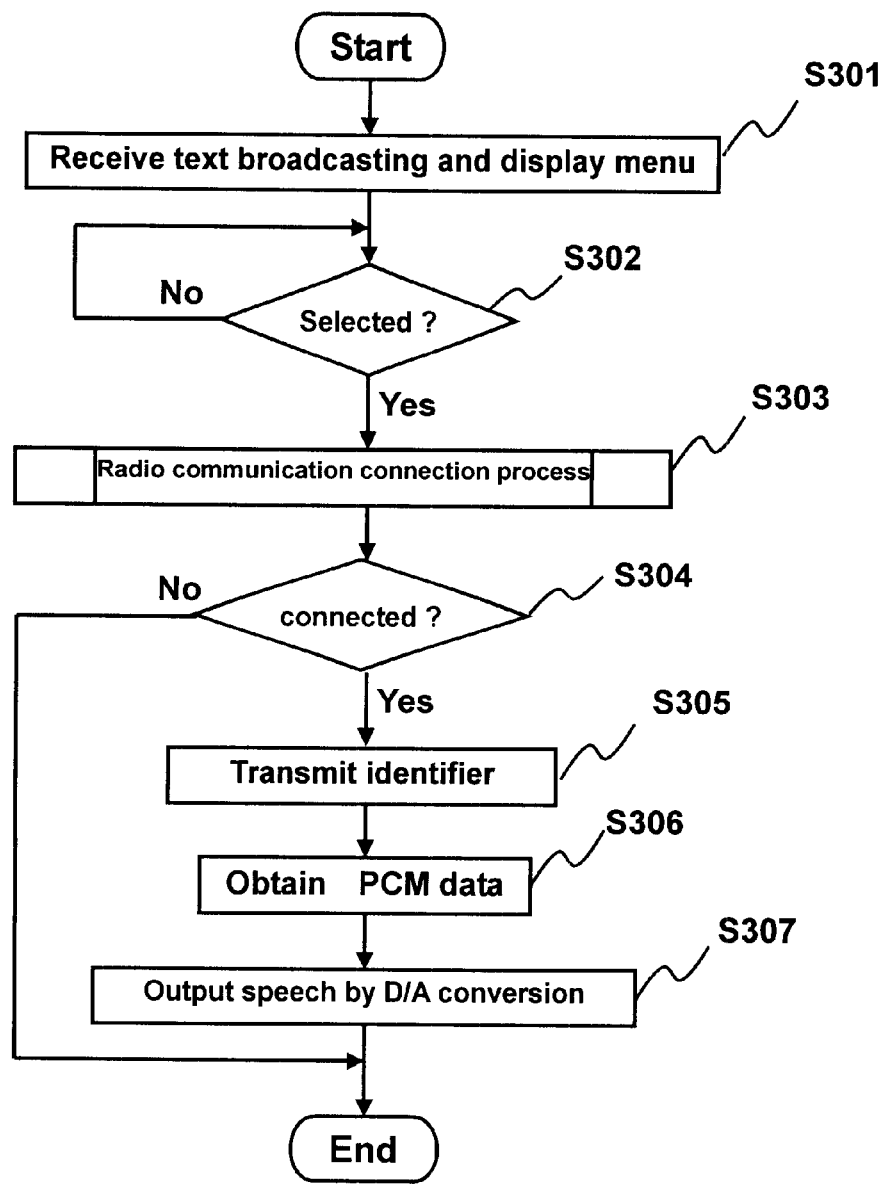
FIG. 3 is a flow chart showing the process procedure of a mobile terminal of Embodiment 1.

FIG. 3 is a flow chart showing the process procedure of the mobile terminal 30 in this embodiment. Although not shown in the figures, the mobile terminal 30 in this embodiment receives menu character strings and the IDs of information corresponding thereto constantly through text broadcasting.

The mobile terminal 30 in this embodiment displays a menu on the information selector 302, based on the menu information and the IDs obtained via text broadcasting (S301). When the user selects information (S302: Yes), a radio communication connection process is performed with a cellular phone, a PHS or the like (S303).

Figure 4:
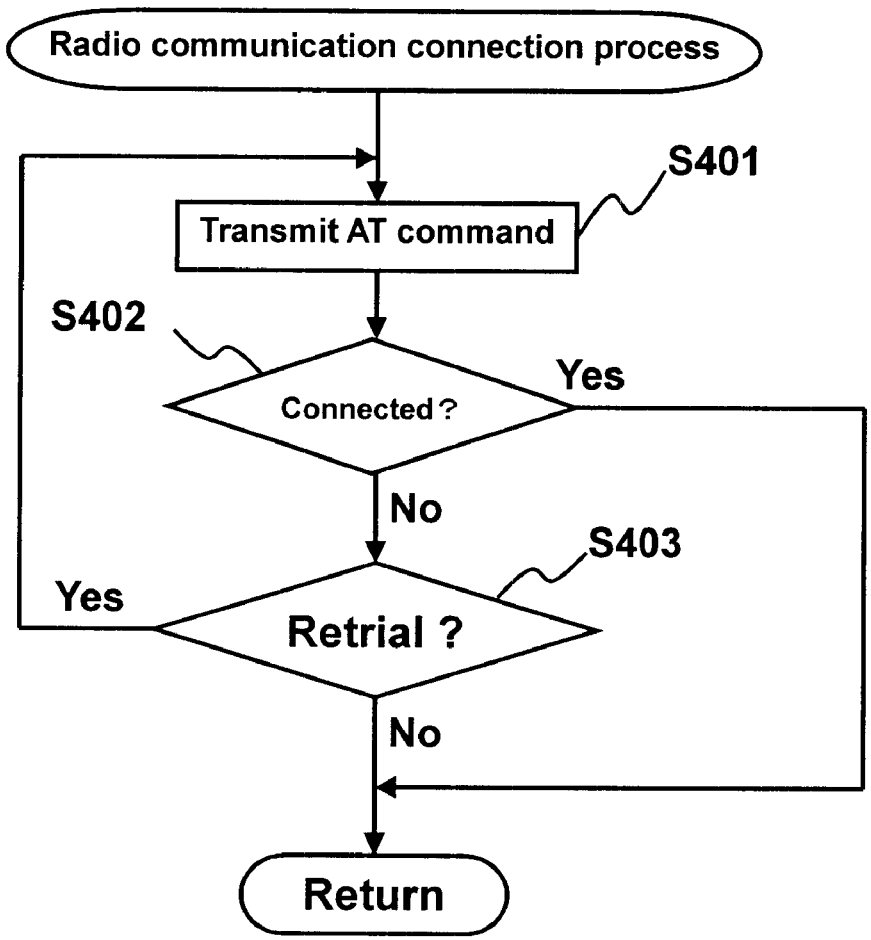
FIG. 4 is a flow chart showing the process procedure of the radio communication connection process shown in FIG. 3.

FIG. 4 is a flow chart showing a detailed process procedure of the radio communication connection process. In the radio communication connection process, first, a telephone number for connection to the network is output by using an AT command (S401). The main part of the mobile terminal 30 in this embodiment is connected to the radio communicator 303 such as a PHS via an AT modem. More specifically, for example, in order to connect to a telephone number "012-345-6789", an AT command "ATDT0123456789" is transmitted to the AT modem.

When radio communication is established (S402: Yes), the radio communication connection process ends. When the connection fails, another attempt is made (S403: Yes) or the process is stopped (S403: No).

Referring back to FIG. 3, when radio communication is established (S304: Yes), the ID of the selected information is transmitted to the information station 10 via radio communication (S305).

When the ID is transmitted to the information station 10, the process as described above is performed on the side of the information station 10, so that PCM data is transmitted to the mobile terminal 30. The mobile terminal 30 obtains the PCM data via radio communication (S306) and the obtained PCM data is D/A-converted so as to output speech (S307).

As described above, the information speech system of this embodiment receives a menu through text broadcasting, so that the number of times of connection to the network can be reduced. Therefore, it is possible to reduce the time that the user waits while connecting to the network.

Embodiment 2

Next, a second embodiment of the present invention will be described below.

Figure 5:
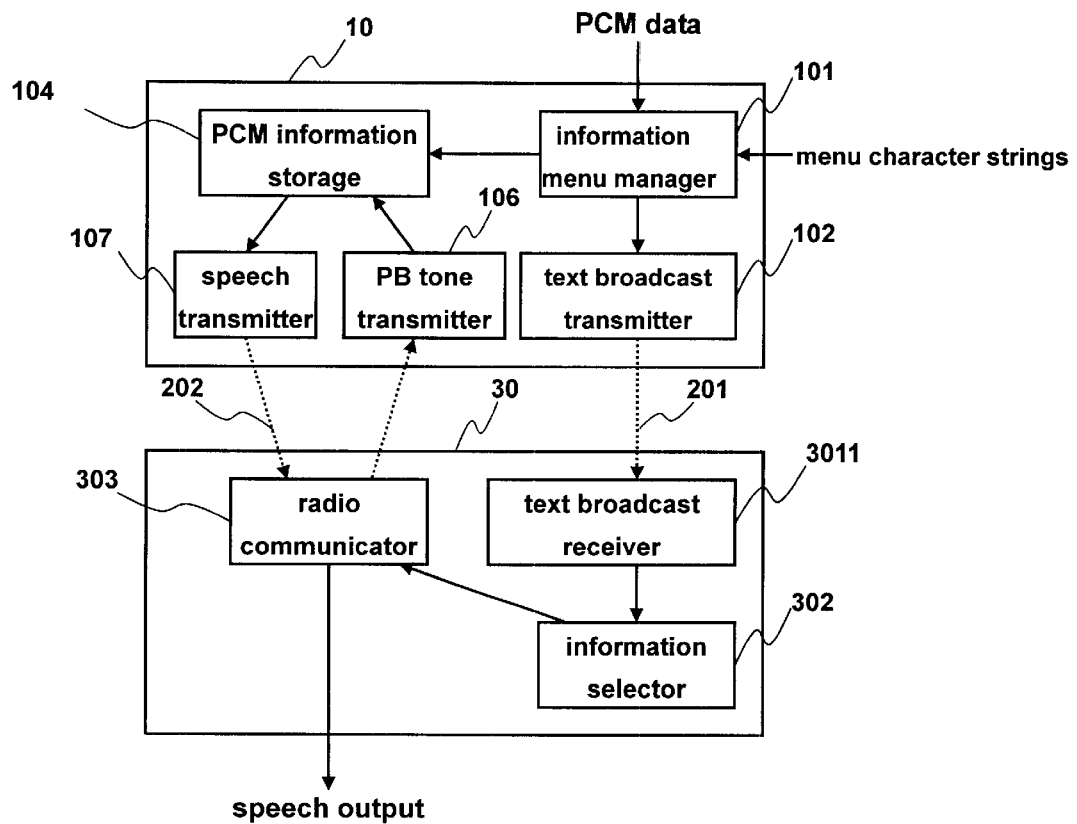
FIG. 5 is a block diagram showing the structure of an information speech system according to Embodiment 2 of the present invention.

FIG. 5 is a block diagram showing the structure of the information speech system according to Embodiment 2 of the present invention.

As shown in FIG. 5, the information speech system in this embodiment includes an information menu manager 101, a text broadcast transmitter 102, a PCM information storage 104, a PB tone receiver 106 and a speech transmitter 107 on the side of the information station 10.

The process procedures of the information manager 101, the text broadcast transmitter 102 and the PCM information storage 104 are not further described, because they are the same as in Embodiment 1.

The PB tone receiver 106 receives a PB (push button) tone representing the ID of the information selected from the menu by the user. In this embodiment, "PB tone" refers to a signal consisting of a series of numbers following "#", when the "#" button is first pushed and then buttons of predetermined numbers are pushed, using a pushbutton dial.

The speech transmitter 107 converts the PCM data obtained from the PCM information storage 104 from digital signals to analog signals representing speech, and transmits this information to the user via radio communication. Since the information already has been converted to analog speech signals when it is transmitted to the mobile terminal 30 in this embodiment, it is necessary to establish the radio communication with a PHS in the so-called telephone mode instead of the data transfer mode.

On the other hand, the mobile terminal 30 in this embodiment includes a text broadcast receiver 3011, an information selector 302, and a radio communicator 303. In this embodiment as in Embodiment 1, a menu is transmitted through TV or radio text broadcasting.

In this embodiment, information for output as speech is transmitted from the speech transmitter 107 in the form of D/A-converted analog speech information. Therefore, the radio communicator 303 on the side of the mobile terminal 30 can output the transmitted speech signal without performing a conversion process.

Figure 6:
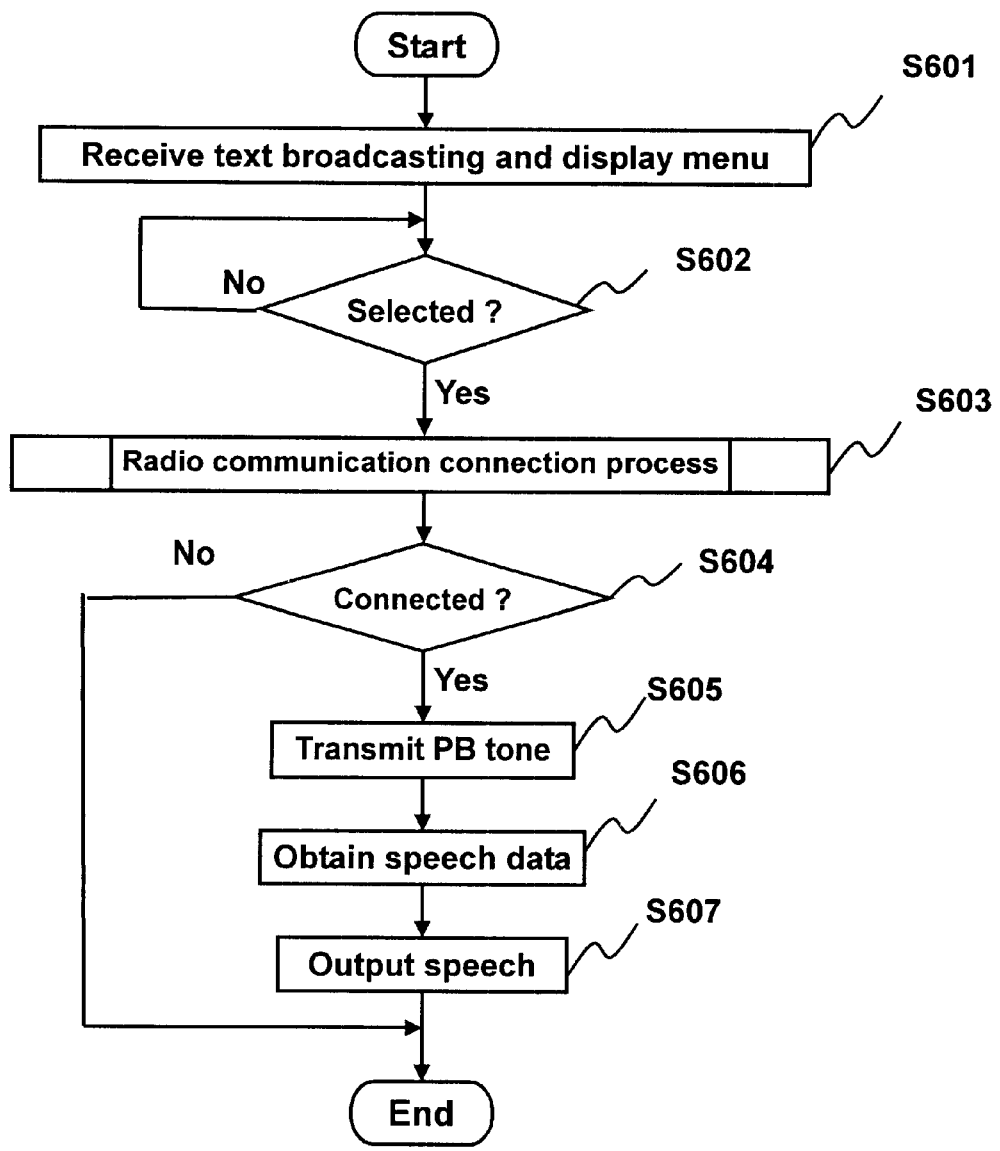
FIG. 6 is a flow chart showing the process procedure of a mobile terminal of Embodiment 2.

FIG. 6 is a flow chart showing the process procedure of the mobile terminal 30 in this embodiment.

The mobile terminal 30 in this embodiment displays a menu on the information selector 302, based on menu character strings and IDs obtained via text broadcasting (S601). When the user selects information (S602: Yes), radio communication is established by a cellular phone, a PHS or the like (S603). The radio communication connection process is not further described, because it has been described in Embodiment 1 with reference to FIG. 4.

After the radio communication connection process, when the radio communication is established (S604: Yes), a PB tone is transmitted by the cellular phone or the PHS that serves as the radio communicator 303 (S605). More specifically, for example, in order to obtain the information of ID "01", an AT command "ATDT#01" is transmitted to the AT modem.

On the side of the information station 10, the PB tone receiver 106 receives the PB tone and transmits the PCM data of the information corresponding to the ID designated by the PB tone to the speech transmitter 107. The speech transmitter 107 converts the PCM data from digital signals to analog signals and transmits the analog PCM data to the mobile terminal 30 as speech signals.

On the side of the mobile terminal 30, the speech data is obtained (S606) and is output as speech (S607).

As described above, the information speech system in this embodiment makes it possible to reduce the time that the user waits and eliminates the D/A conversion mechanism in the mobile terminal.

Embodiment 3

Next, a third embodiment of the present invention will be described below.

Figure 7:
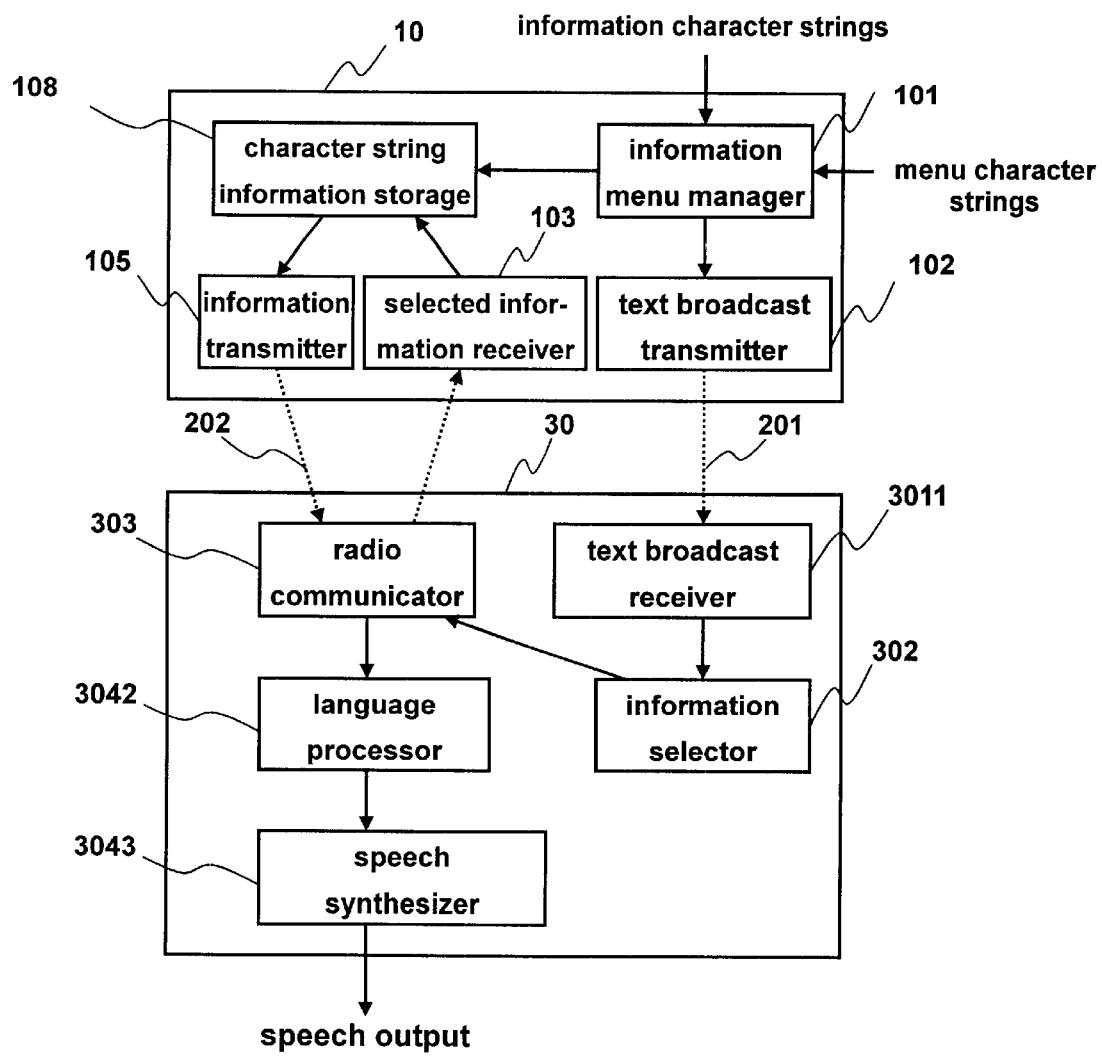
FIG. 7 is a block diagram showing the structure of an information speech system according to Embodiment 3 of the present invention.

FIG. 7 is a block diagram showing the structure of the information speech system according to Embodiment 3 of the present invention.

As shown in FIG. 7, the information speech system in this embodiment includes an information menu manager 101, a text broadcast transmitter 102, a selected-information receiver 103, an information transmitter 105, and a character string information storage 108 on the side of the information station 10.

The process procedures of the text broadcast transmitter 102, the selected-information receiver 103 and the information transmitter 105 are not further described, because they are the same as in Embodiment 1.

The character string information storage 108 stores information provided with the ID in the form of character string information, and transmits the character string information to be transmitted to the user to the information transmitter 105, based on the ID received by the selected information receiver 103. Accordingly, the information menu manager 101 in this embodiment assigns an ID to an information character string obtained externally and transmits the character string information to the character string information storage 108. The content of the menu information is the same as that in Embodiment 1.

On the other hand, the mobile terminal 30 in this embodiment includes a text broadcast receiver 3011, an information selector 302, a radio communicator 303, a language processor 3042 and a speech synthesizer 3043. In this embodiment, as in Embodiment 1, the menu is transmitted through TV or radio text broadcasting.

Since information for output as speech is transmitted in the form of character string information stored in the character string information storage 108 in this embodiment, the transmitted character string information is converted to a speech signal by the language processor 3042 and the speech synthesizer 3043 on the side of the mobile terminal 30.

The language processor 3042 converts the transmitted character string information to a phonetic character string for speech synthesis. "Phonetic character string" refers to a string of phonetic symbols, namely a string of characters that indicate pronunciation. As described above, conversion dictionary data are required to convert the character string information to the phonetic character string. The language processor 3042 includes conversion dictionary data, which is not shown in FIG. 7.

Furthermore, the speech synthesizer 3043 synthesizes speech by using the phonetic character strings generated by the language processor 3042 and outputs information as speech. A dictionary for speech synthesis is required and the speech synthesizer 3043 includes dictionary data for speech synthesis, which is not shown in FIG. 7.

The process of converting character string information to phonetic character strings and the process of synthesizing speech based on the phonetic character strings are not described in detail, because they can be performed by known techniques (e.g., disclosed in "Development of High Quality Japanese Text-To-Speech System" Proceeding of the 49$^{th}$ National Convention of the Information Processing Society., (1994), pp2–41; "HIGH-QUALITY JAPANESE TEXT-TO-SPEECH SYSTEM: NARSYS" ESCA. EUROSPEECH' 95.4* European Conference on Speech Communication and Technology, Madrid, September 1995, ISSN 1018–4074, pp.1861–1864).

Figure 8:
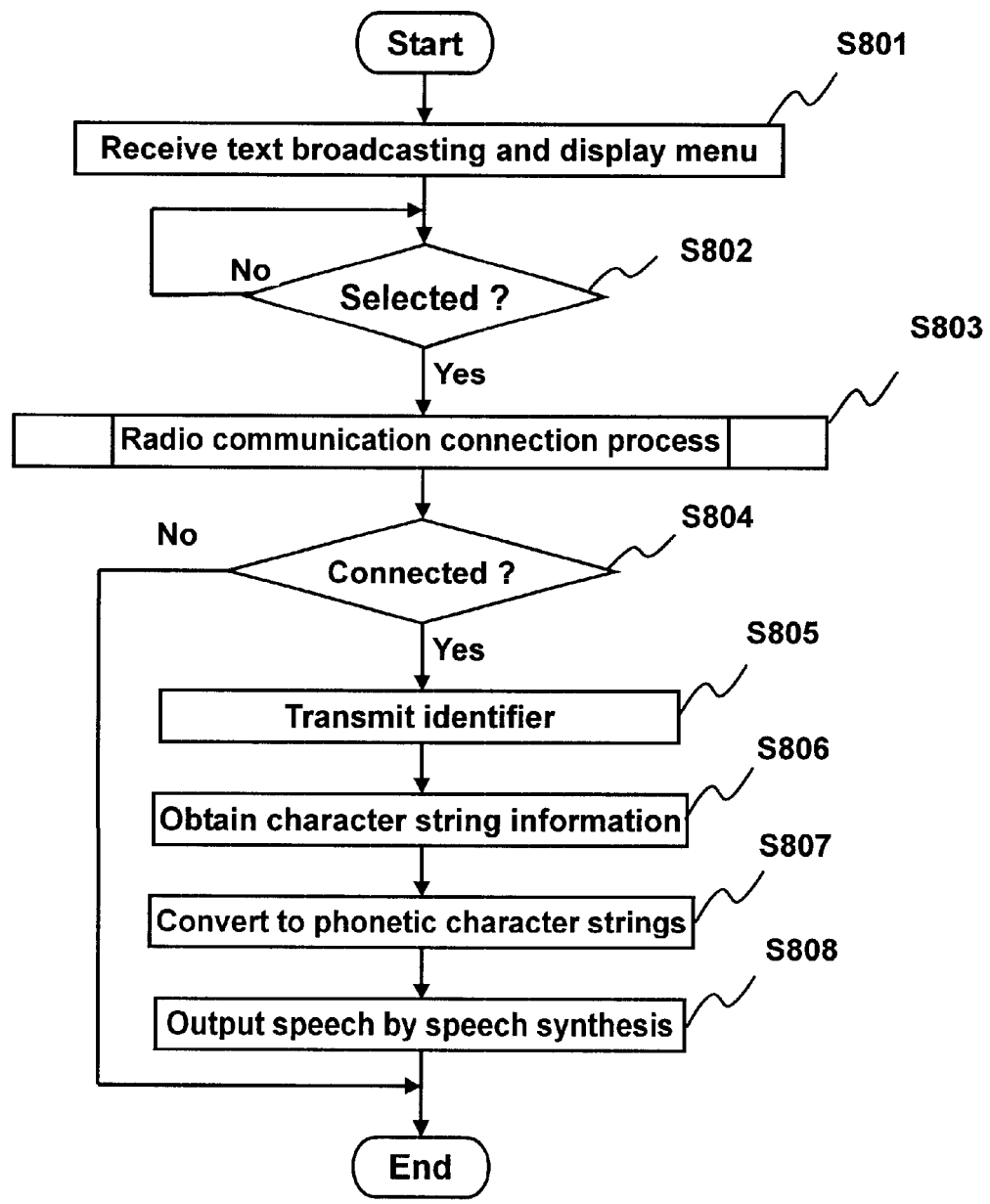
FIG. 8 is a flow chart showing the process procedure of a mobile terminal of Embodiment 3.

FIG. 8 is a flow chart showing the process procedure of the mobile terminal 30 in this embodiment. In this embodiment as in Embodiment 1, the mobile terminal 30 receives text broadcasting constantly, although this is not shown in FIG. 8.

The process steps (S801 to S803) up to the radio communication connection process in the mobile terminal 30 in this embodiment are not further described, because they are the same as in Embodiment 1.

After the radio communication connection process (S803), if radio communication is established (S804; Yes), the mobile terminal 30 in this embodiment transmits the ID of the selected information to the information station 10 via radio communication by the radio communicator 303 such as a cellular phone or a PHS (S805).

When the ID is transmitted to the information station 10, the information station 10 transmits character string information to the mobile terminal 30, so that the mobile terminal 30 obtains the character string information via radio communication (S806) and converts the obtained character string information to phonetic character strings (S807). Then, the speech synthesizer 3043 synthesizes speech, and the information is output as speech (S808).

As described above, the information speech system in this embodiment makes it possible to reduce the time that the user waits for connection, and to reduce communication costs of radio communication with a PHS or the like, because information is transmitted via radio communication in the form of character string information instead of PCM data.

Embodiment 4

Next, a fourth embodiment of the present invention will be described below.

Figure 9:
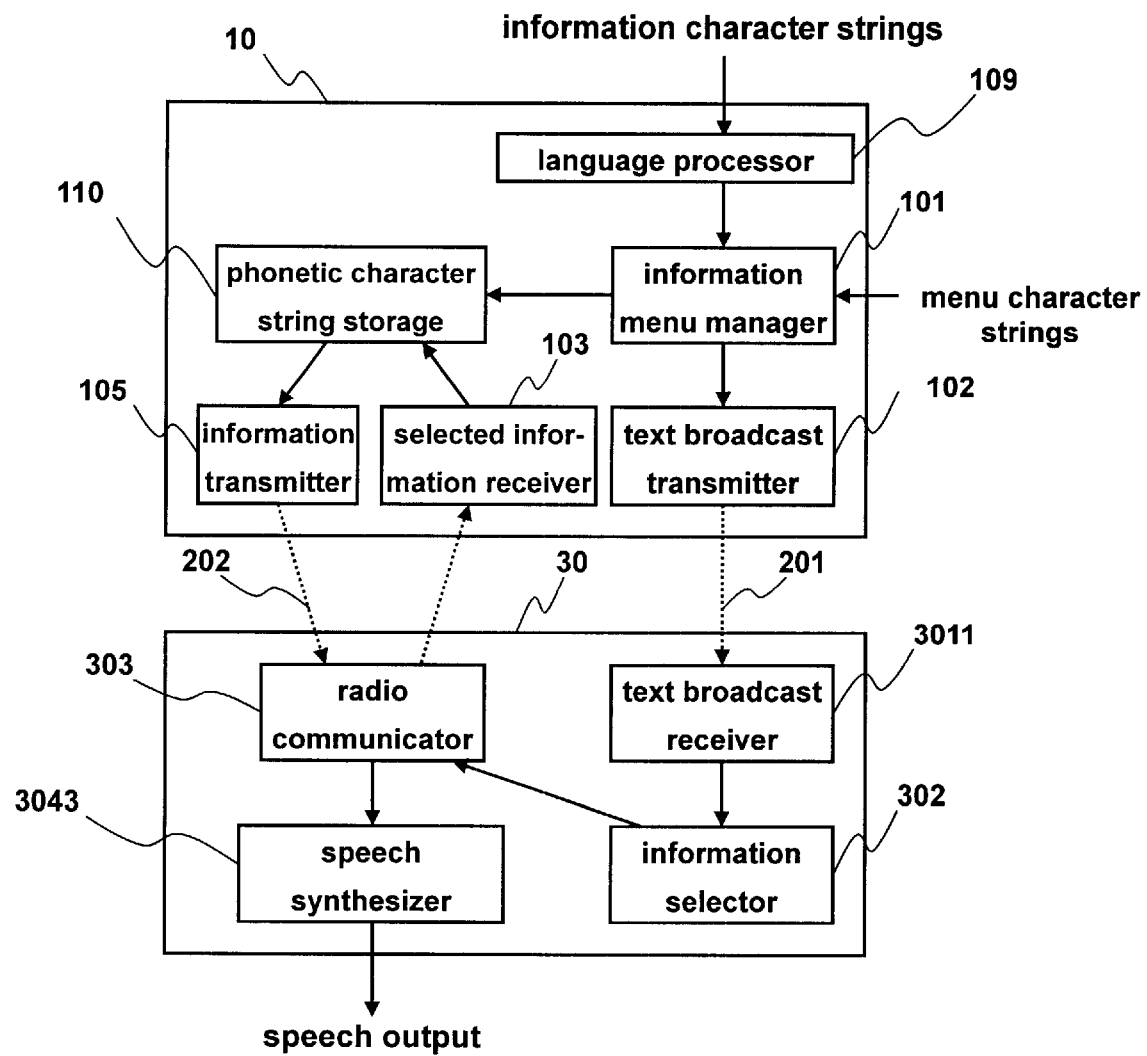
FIG. 9 is a block diagram showing the structure of an information speech system according to Embodiment 4 of the present invention.

FIG. 9 is a block diagram showing the structure of the information speech system according to Embodiment 4 of the present invention.

As shown in FIG. 9, the information speech system in this embodiment includes an information menu manager 101, a text broadcast transmitter 102, a selected-information receiver 103, an information transmitter 105, a language processor 109, and a phonetic character string storage 110 on the side of the information station 10.

The process procedures of the text broadcast transmitter 102, the selected-information receiver 103 and the information transmitter 105 are not further described, because they are the same as in Embodiment 1.

The process of the language processor 109 is the same as that of the language processor 3042 included in the mobile terminal 30 in Embodiment 3. More specifically, the language processor 109 converts externally obtained information character strings to phonetic character strings in the information station 10. Accordingly, the information menu manager 101 in this embodiment assigns an ID to the converted phonetic character string and transmits the same to the phonetic character string storage 110. The content of the menu information is the same as that in Embodiment 1.

The phonetic character string storage 110 stores the phonetic character strings with the IDs of information, and transmits the phonetic character string to be transmitted to the user to the information transmitter 105, based on the ID received by the selected-information receiver 103.

On the other hand, the mobile terminal 30 in this embodiment includes a text broadcast receiver 3011, an information selector 302, a radio communicator 303, and a speech synthesizer 3043. In this embodiment as in Embodiment 1, the menu is transmitted through TV or radio text broadcasting.

In this embodiment, since information for output as speech is transmitted in the form of phonetic character string information stored in the phonetic character string information storage 110, it is unnecessary to include the language processor 3042 in the mobile terminal 30. The transmitted phonetic character strings are converted to speech signals in the speech synthesizer 3043.

Figure 10:
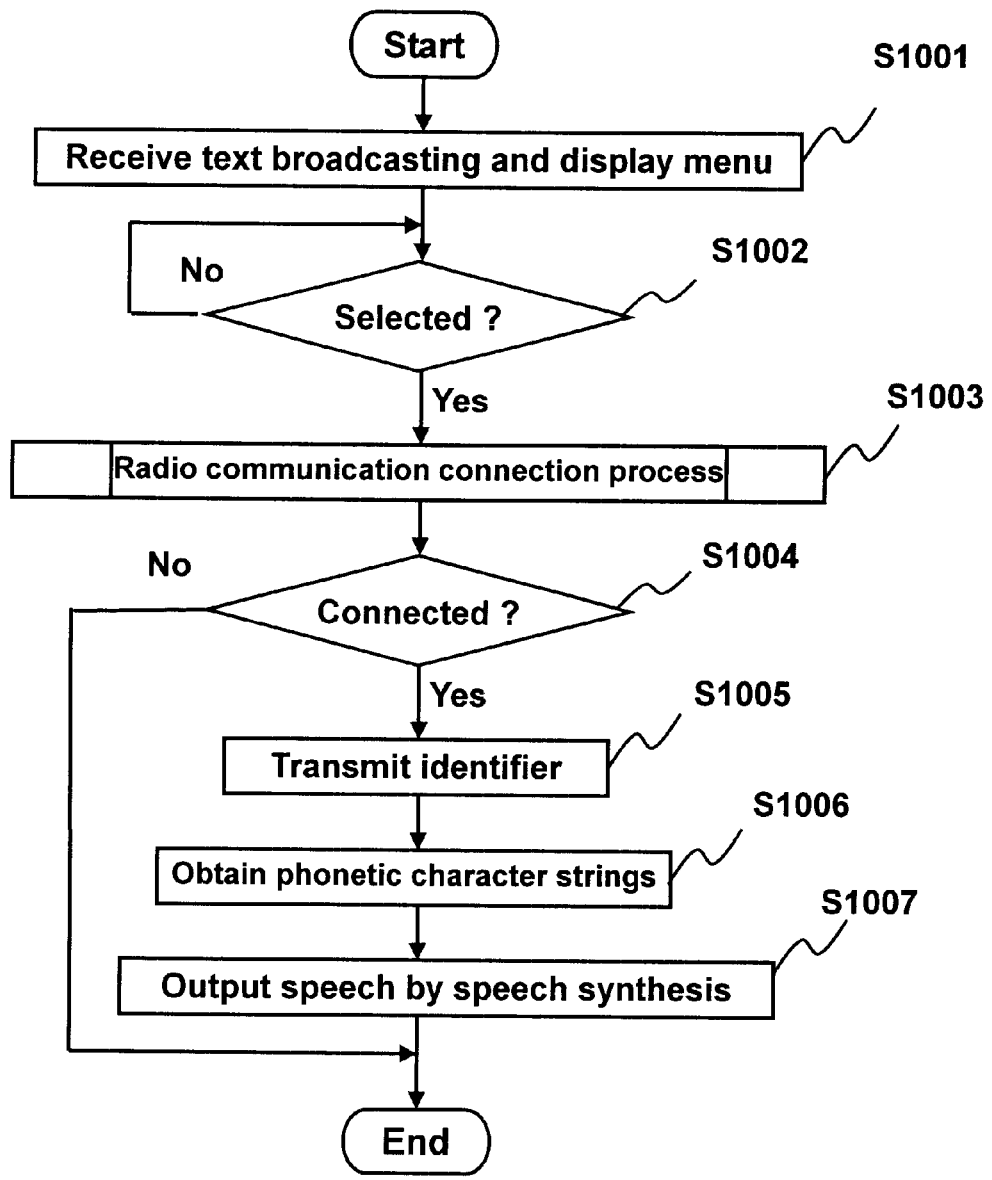
FIG. 10 is a flow chart showing the process procedure of a mobile terminal of Embodiment 4.

FIG. 10 is a flow chart showing the process procedure of the mobile terminal 30 in this embodiment. In this embodiment as in Embodiment 1, the mobile terminal 30 receives text broadcasting constantly, although this is not shown in FIG. 10.

The processes (S1001 to S1005) in the mobile terminal 30 in this embodiment up to the process where the ID of the selected information is transmitted to the information station 10 are not further described, because they are the same as those in Embodiment 3.

When the ID is transmitted to the information station 10, the information station 10 transmits phonetic character string information to the mobile terminal 30, so that the mobile terminal 30 obtains the phonetic character string information via radio communication (S1006). Then, the speech synthesizer 3043 synthesizes speech from the obtained phonetic character strings, and the information is output as speech (S1007).

As described above, the information speech system in this embodiment makes it possible to reduce the time that the user waits for connection, and facilitates the maintenance of a dictionary for language processing that is necessary to convert character string information to phonetic character strings, because the language processor is included in the information station 10.

Embodiment 5

Next, a fifth embodiment of the present invention will be described below.

Figure 11:
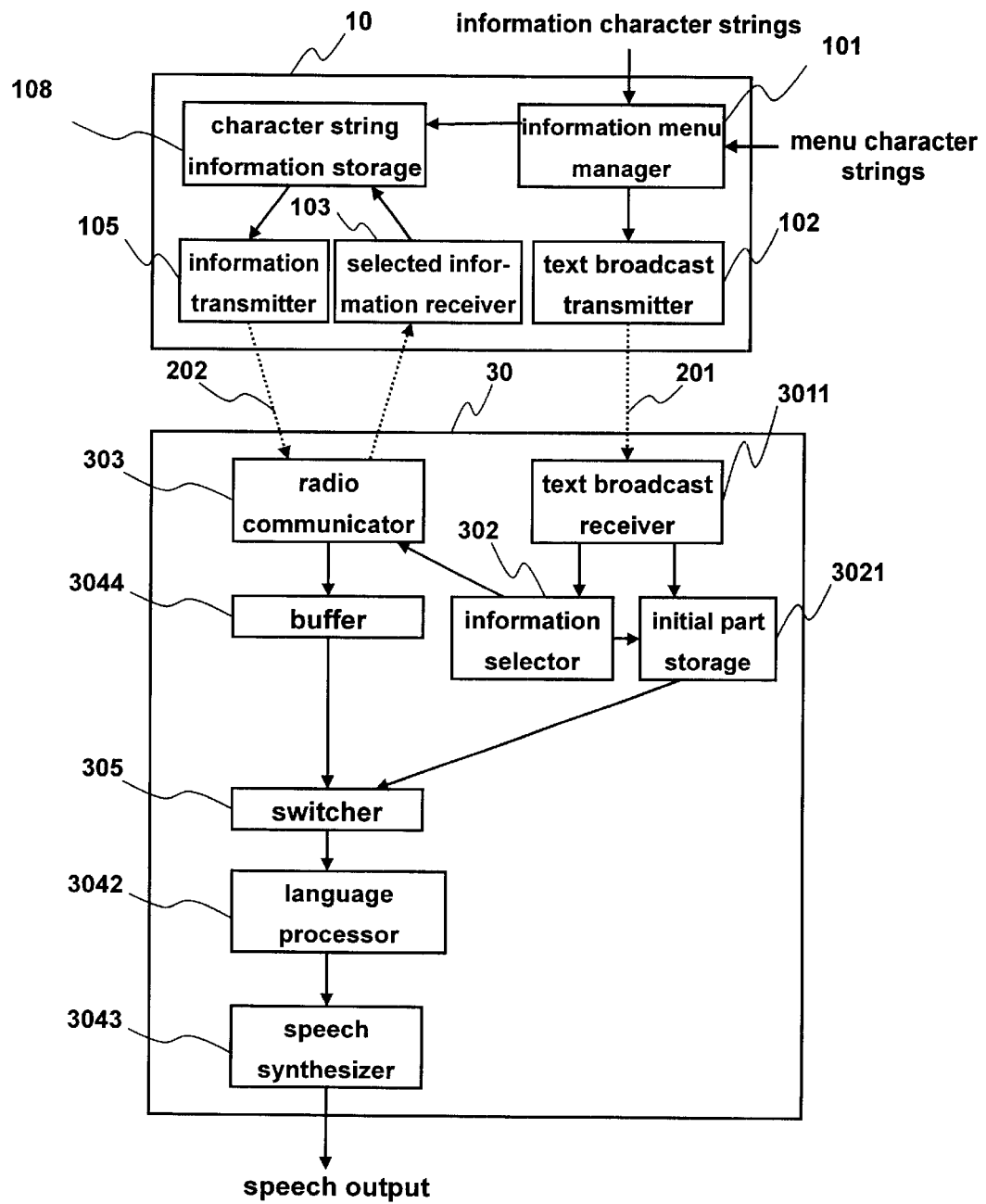
FIG. 11 is a block diagram showing the structure of an information speech system according to Embodiment 5 of the present invention.

FIG. 11 is a block diagram showing the structure of the information speech system according to Embodiment 5 of the present invention.

As shown in FIG. 11, the information speech system in this embodiment includes an information menu manager 101, a text broadcast transmitter 102, a selected-information receiver 103, an information transmitter 105, and a character string information storage 108 on the side of the information station 10.

The text broadcast transmitter 102 in this embodiment, which is different from that in the previous embodiments, broadcasts character string information of the initial part of each information, in addition to the menu character strings and the IDs, as the menu information. Therefore, the information menu manager 101 transmits the initial part of the character string information, for example, a predetermined number of characters of the initial part together with the menu character strings and the IDs to the text broadcast transmitter 102. The character strings of other parts than the initial part transmitted to the text broadcast transmitter 102 are transmitted with their IDs to the character string information storage 108.

The character string information storage 108 only stores character strings of the remaining part other than the initial part of each information of all the character string information provided with an ID, and transmits the character string information to be transmitted to the user to the information transmitter 105, based on the ID received by the selected-information receiver 103.

On the other hand, the mobile terminal 30 in this embodiment includes a text broadcast receiver 3011, an information selector 302, a radio communicator 303, a language processor 3042 and a speech synthesizer 3043, an initial part storage 3021, a buffer 3044 and a switcher 305.

The initial part storage 3021 stores the character string information of the initial part of the information broadcast via text broadcasting.

The buffer 3044 temporarily stores the character string information of other parts than the initial part transmitted from the information station 10 via radio communication.

The switcher 305 performs a switching process so that the character strings of the initial part are transmitted to the language processor 3042 while the character strings of the initial part stored in the initial part storage 3021 are output as speech, and upon completion of the speech output of the initial part, the character strings stored in the buffer 3044 are transmitted to the language processor 3042.

Figure 12:
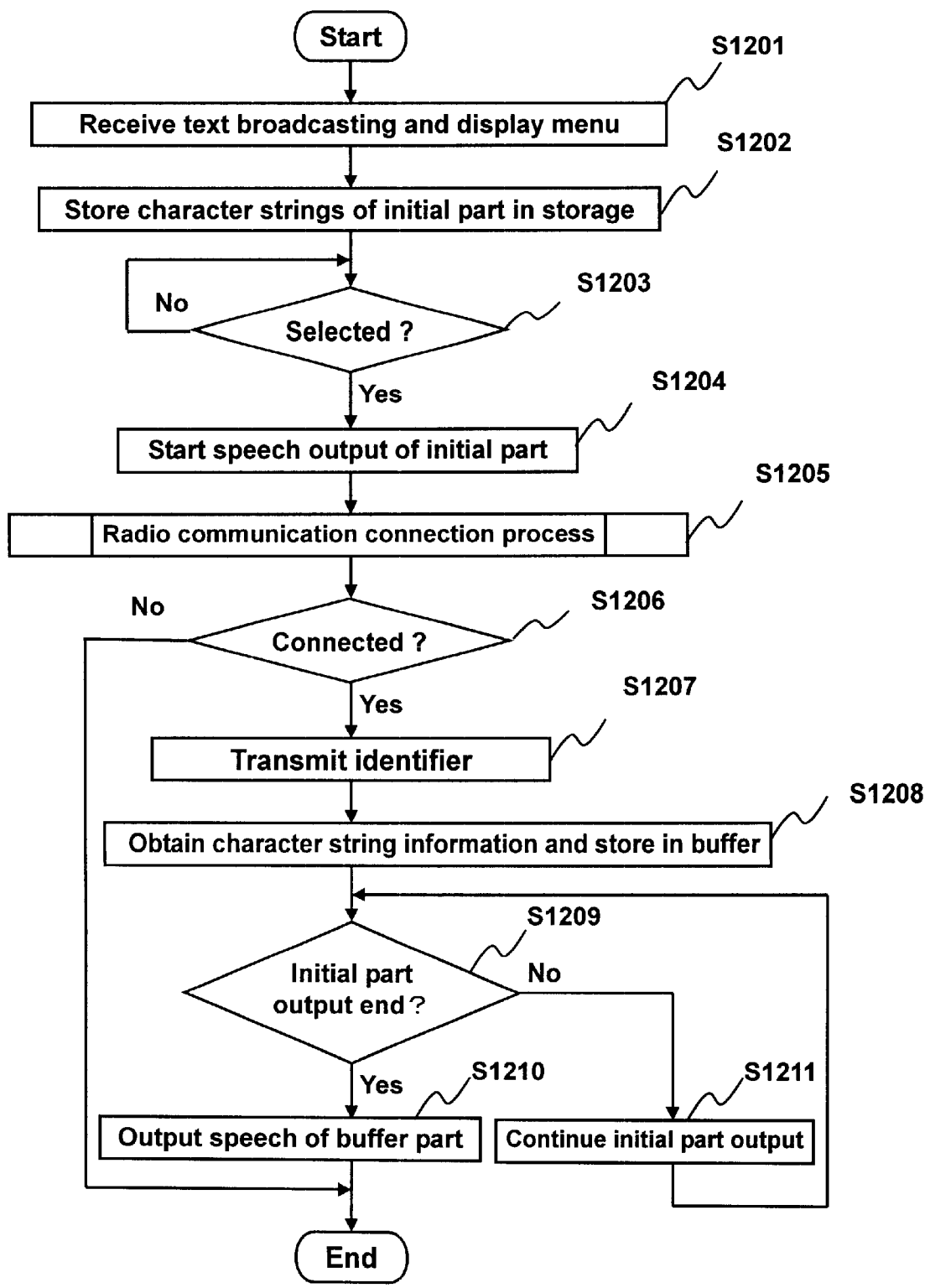
FIG. 12 is a flow chart showing the process procedure of a mobile terminal of Embodiment 5.

FIG. 12 is a flow chart showing the process procedure of the mobile terminal 30 in this embodiment. In this embodiment as in Embodiment 1, the mobile terminal 30 receives text broadcasting constantly, although this is not shown in FIG. 12.

The mobile terminal 30 in this embodiment receives text broadcasting and displays a menu (S1201), and stores the character strings of the initial part of information transmitted via text broadcasting in the initial part storage 3021 (S1202).

When the user selects information(S1203: Yes), the character strings of the initial part stored in the initial part storage 3021 is output as speech, which is started by a switching process of the switcher 305 (S1204).

Thereafter, the radio communication connection process is performed in the same manner as in the previous embodiments (S1205). If radio communication is established (S1206: Yes), the ID of the selected information is transmitted to the information station 10 via radio communication by the radio communicator 303 such as a cellular phone, a PHS or the like (S1207).

When the ID is transmitted to the information station 10, the information station 10 transmits the character string information of other parts than the initial part to the mobile terminal 30, so that the mobile terminal 30 obtains the character string information via radio communication and first stores the obtained character string information in the buffer 3044 (S1208). If the output of the initial part as speech is completed (S1209: Yes), the switcher 305 performs a switching process so that the character string information stored in the buffer 3044 is output as speech (S1210). If the output of the initial part as speech has not been completed yet (S1209: No), the initial part continues to be output as speech (S1211).

As described above, the information speech system in this embodiment makes it possible to further reduce the time that the user waits, because the initial part of the information is output as speech while the radio communication connection process is performed.

Embodiment 6

Next, a sixth embodiment of the present invention will be described below.

Figure 13:
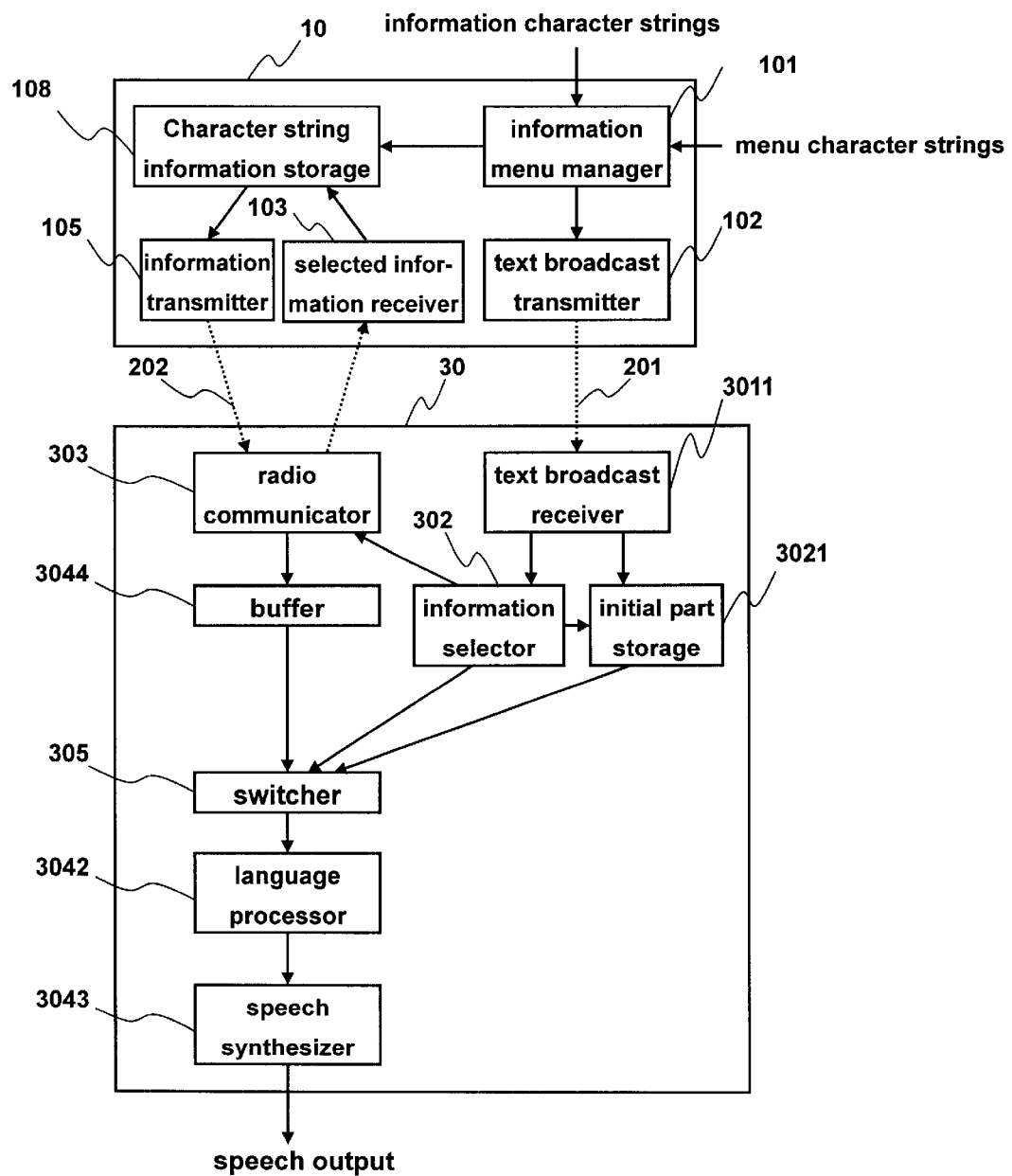
FIG. 13 is a block diagram showing the structure of an information speech system according to Embodiment 6 of the present invention.

FIG. 13 is a block diagram showing the structure of the information speech system according to Embodiment 6 of the present invention. As shown in FIG. 13, the structure of the information station 10 in the information speech system in this embodiment is the same as that in Embodiment 5.

On the other hand, the structure of the mobile terminal 30 in this embodiment is substantially the same as that in Embodiment 5, except that menu character strings are transmitted from the information selector 302 to the switcher 305.

In order to output speech, the switcher 305 performs a switching process in the following manner. First, the menu character strings transmitted from the information selector 302 are transmitted to the language processor 3042. Upon the completion of the transmission, the character strings of the initial part stored in the initial part storage 3021 are transmitted to the language processor 3042. Then, upon the completion of outputting the initial part as speech, the character strings stored in the buffer 3044 are transmitted to the language processor 3042. However, when the user selects information in the middle of outputting the menu character strings as speech, it is unnecessary for the switcher 305 to performs the switching process thereafter. Furthermore, after the selection of information, the speech outputting process may be stopped, or only information corresponding to the selected information may be output as speech. The menu information in this embodiment is the same as that in Embodiment 5.

Figure 14:
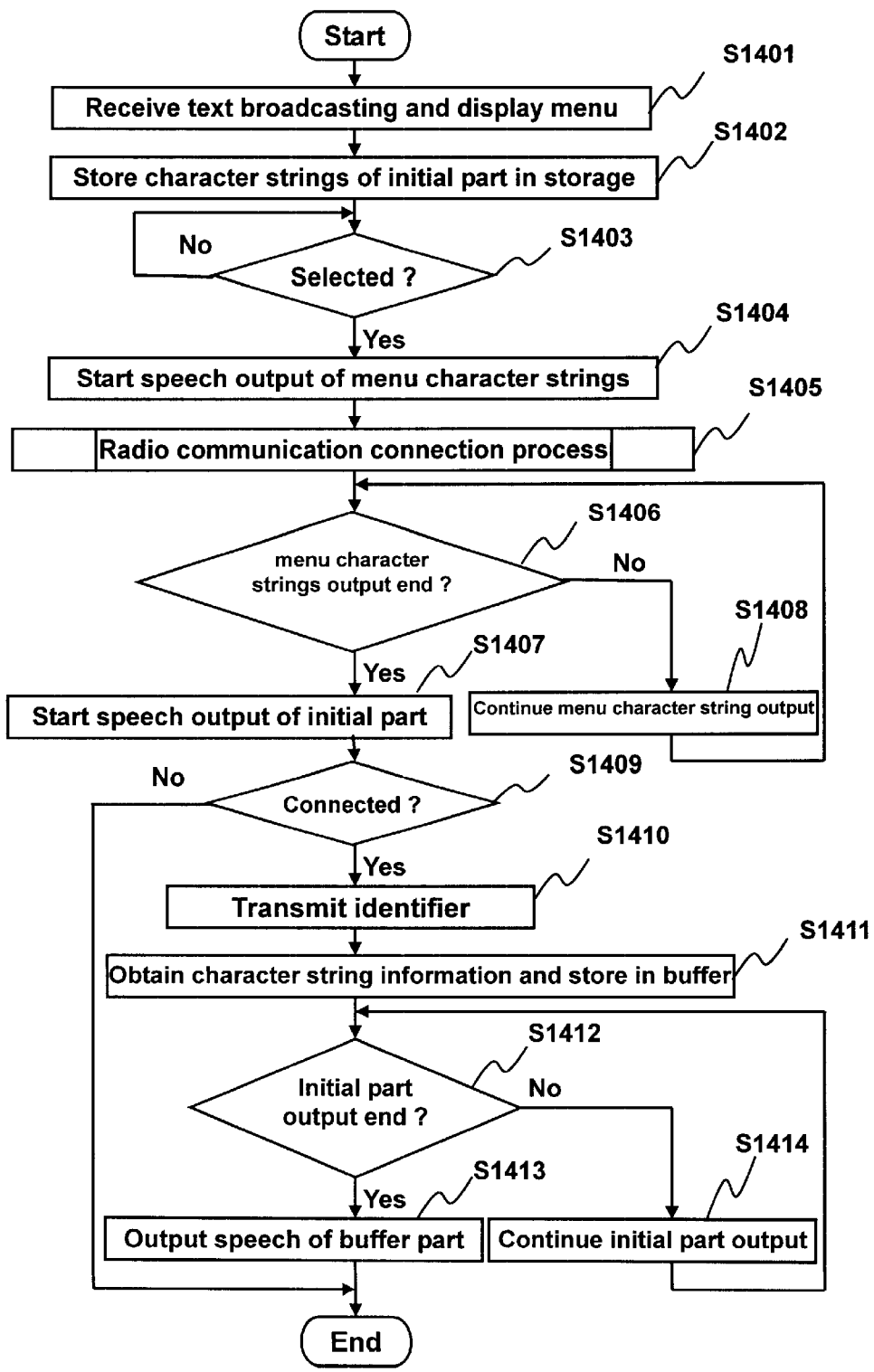
FIG. 14 is a flow chart showing the process procedure of a mobile terminal of Embodiment 6.

FIG. 14 is a flow chart of the process procedure of the mobile terminal 30 in this embodiment. The mobile terminal 30 receives the text broadcasting constantly as in Embodiment 1, although this is not shown in FIG. 14.

The mobile terminal 30 in this embodiment as in Embodiment 5 receives text broadcasting so as to display a menu (S1401), and stores the character strings of the initial part transmitted via text broadcasting in the initial part storage 3021 (S1402).

When the user selects information (S1403: Yes), the switcher 305 performs a switching process so that the menu character strings stored in the information selector 302 start to be output as speech (S1404).

Thereafter, the radio communication connection process is performed in the same manner as in the previous embodiments (S1405). When the output of the menu character strings is completed (S1406: Yes), the switcher 305 performs a switching process so that the character strings of the initial part stored in the initial part storage 3021 start to be output as speech (S1407). If the output of the menu character strings has not been completed yet at this time (S1406: No), the output of the menu character strings continues (S1408).

Furthermore, when the radio communication is established (S1409: Yes), the ID of the selected information is transmitted to the information station 10 via radio communication with the radio communicator 303 such as a cellular phone, a PHS or the like (S1410).

When the ID is transmitted to the information station 10, the information station 10 transmits the character string information of other parts than the initial part to the mobile terminal 30, so that the mobile terminal 30 obtains the character string information via radio communication and first stores the obtained character string information in the buffer 3044 (S1411). If the output of the initial part as speech is completed (S1412: Yes), the switcher 305 performs a switching process so that the character string information stored in the buffer 3044 is output as speech (S1413). If the output of the initial part as speech has not been completed yet (S1412: No), the initial part continues to be output as speech (S1414).

As described above, the information speech system in this embodiment makes it possible to reduce the amount of information of character strings of the initial part to be transmitted via text broadcasting when the time that the user waits is reduced to the same extent as in Embodiment 5, because not only the initial part of the information but also menu character strings are used as information to be output as speech while the radio communication connection process is performed.

Embodiment 7

Next, a seventh embodiment of the present invention will be described below.

Figure 15:
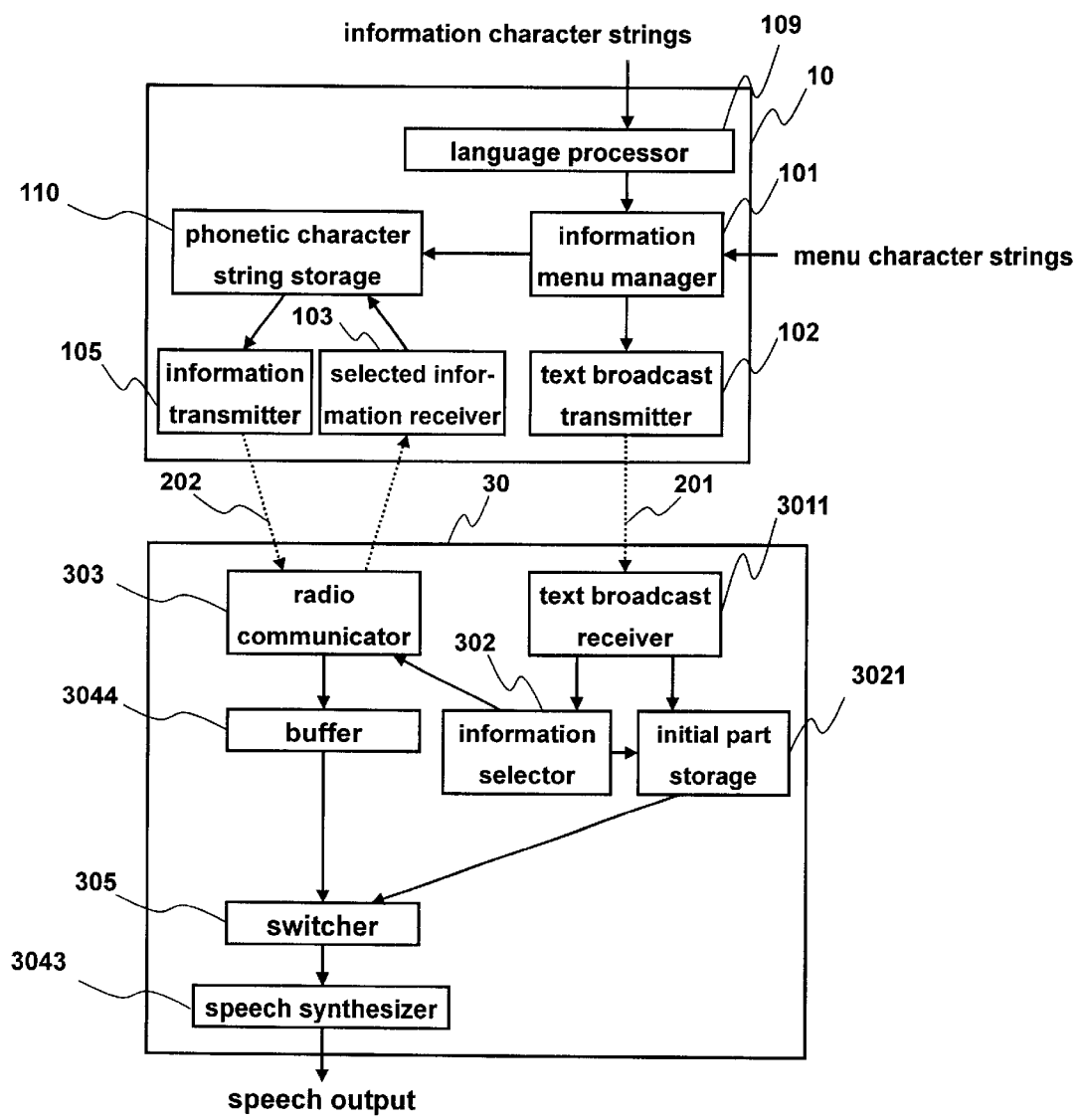
FIG. 15 is a block diagram showing the structure of an information speech system according to Embodiment 7 of the present invention.

FIG. 15 is a block diagram showing the structure of the information speech system according to Embodiment 7 of the present invention.

As shown in FIG. 15, the information speech system in this embodiment includes an information menu manager 101, a text broadcast transmitter 102, a selected-information receiver 103, an information transmitter 105, a language processor 109, and a phonetic character string storage 110 on the side of the information station 10.

The mobile terminal 30 in this embodiment includes a text broadcast receiver 3011, an information selector 302, a radio communicator 303, a speech synthesizer 3043, an initial part storage 3021, a buffer 3044, and a switcher 305.

The language processor 109 is included in the information station 10 in this embodiment, whereas the language processor 3042 is included in the mobile terminal 30 in Embodiment 5. Furthermore, in this embodiment, the information stored in the information station 10, namely, the information of the initial part information and the information of other parts than the initial part are stored in the form of phonetic character strings, as in Embodiment 4. Accordingly, the menu information in this embodiment includes phonetic character strings of the initial part of each information, in addition to the menu character strings and the IDs.

The process of the mobile terminal 30 in this embodiment is substantially the same as that described with reference to FIG. 12, except that the phonetic character strings are converted to speech by the speech synthesizer 3043 without language processing so as to output the initial part of the information and the information stored in the buffer 3044 as speech.

As described above, the information speech system in this embodiment makes it possible to further reduce the time that the user waits for connection, and facilitates the maintenance of a dictionary for language processing for converting character string information to phonetic character strings.

Embodiment 8

Next, an eighth embodiment of the present invention will be described below.

Figure 16:
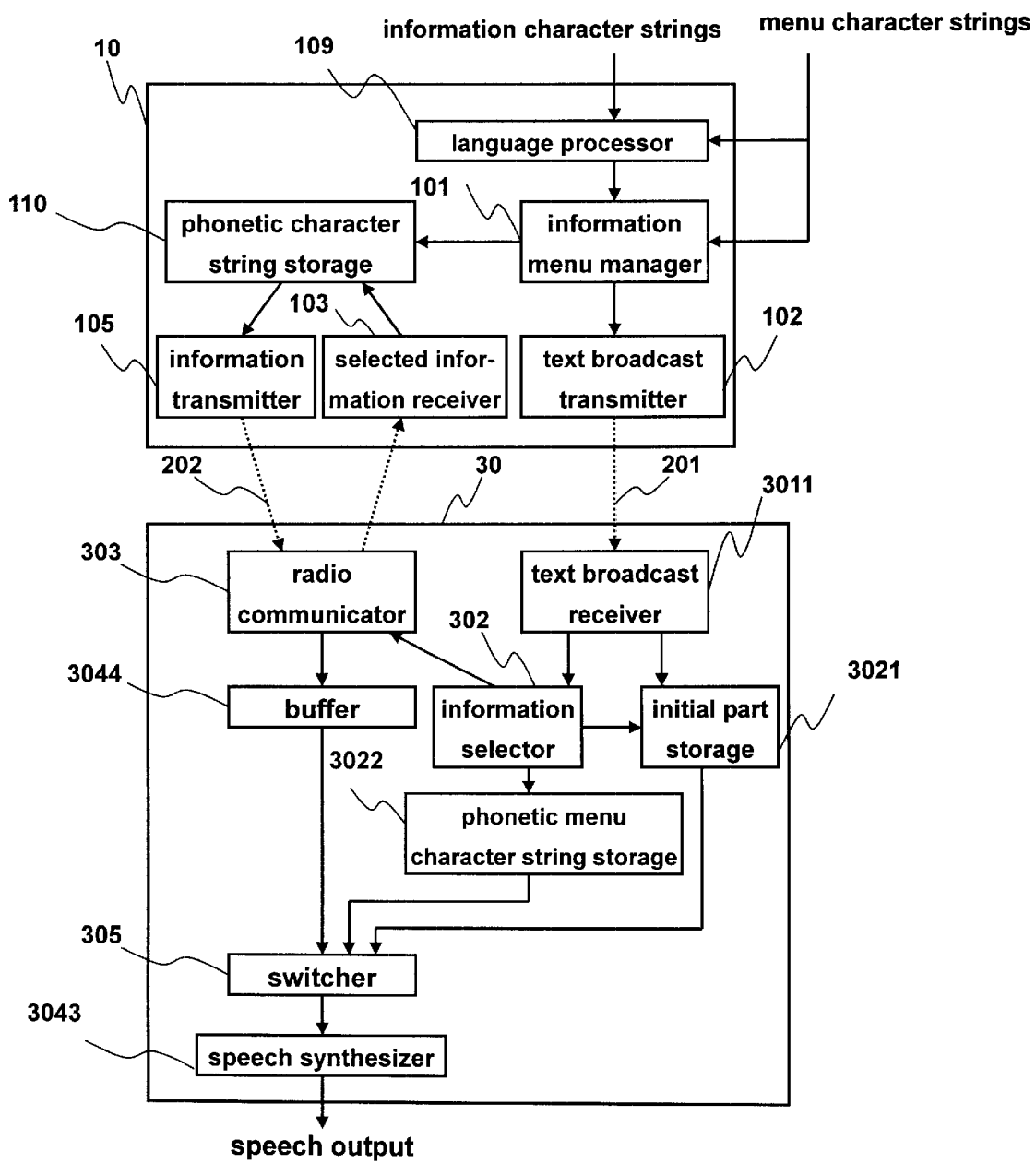
FIG. 16 is a block diagram showing the process procedure of an information speech system of Embodiment 8 of the present invention.

FIG. 16 is a block diagram showing the structure of the information speech system according to Embodiment 8 of the present invention.

As shown in FIG. 16, the information speech system in this embodiment includes an information menu manager 101, a text broadcast transmitter 102, a selected-information receiver 103, an information transmitter 105, a language processor 109, and a phonetic character string storage 110 on the side of the information station 10.

The mobile terminal 30 in this embodiment includes a text broadcast receiver 3011, an information selector 302, a radio communicator 303, a speech synthesizer 3043, an initial part storage 3021, a buffer 3044, a switcher 305, and a phonetic menu character string storage 3022.

The structures of the information station 10 and the mobile terminal 30 are the same as those in Embodiment 7, except that the mobile terminal 30 in this embodiment further includes the phonetic menu character string storage 3022.

The difference in the structure between this embodiment and Embodiment 7 brings about the following difference in the processes of some elements. The language processor 109 in this embodiment converts not only information character strings but also menu character strings to phonetic character strings. The text broadcast transmitter 102 transmits menu information including menu character strings, phonetic character strings of the initial part of the information and phonetic character strings converted from the menu character strings (hereinafter, referred to as "phonetic menu character strings") via text broadcasting.

Furthermore, the mobile terminal 30 stores the phonetic menu character strings received via text broadcasting in the phonetic menu character string storage 3022. In order to output information as speech, the switcher 305 performs the following switching process: First, the phonetic menu character strings are output as speech. Upon the completion of outputting the phonetic menu character strings as speech, the phonetic character strings of the initial part of the information stored in the initial part storage 3021 are output as speech. Then, upon the completion of outputting the initial part as speech, the phonetic character strings of the information obtained via radio communication with a PHS are output as speech. When the user selects information before the completion of outputting the phonetic menu character strings as speech, the subsequent process is the same as described in Embodiment 6. More specifically, it is unnecessary to perform the switching process thereafter. The speech-outputting process may be stopped, or only the information corresponding to the selected information may be output as speech.

Therefore, the process of the mobile terminal 30 in this embodiment is substantially the same as that in Embodiment 6 described with reference to the flow chart of FIG. 14, except for the following points. "Character strings" in the flow chart of FIG. 14 is replaced by "phonetic character strings" in this embodiment. Moreover, at S1402, in addition to the process where the phonetic character strings of the initial part are stored in the initial part storage 3021, the phonetic menu character strings are stored in the phonetic menu character string storage 3022.

Furthermore, in this embodiment, speech synthesis is performed with phonetic character strings without performing language processing, so that the phonetic menu character strings, the initial part of the information, and the information stored in the buffer 3044 are output as speech.

As described above, the information speech system in this embodiment makes it possible to further reduce the time that the user waits for connection, and facilitates the maintenance of a dictionary for language processing for converting character string information to phonetic character strings.

Embodiment 9

Next, a ninth embodiment of the present invention will be described below.

Figure 17:
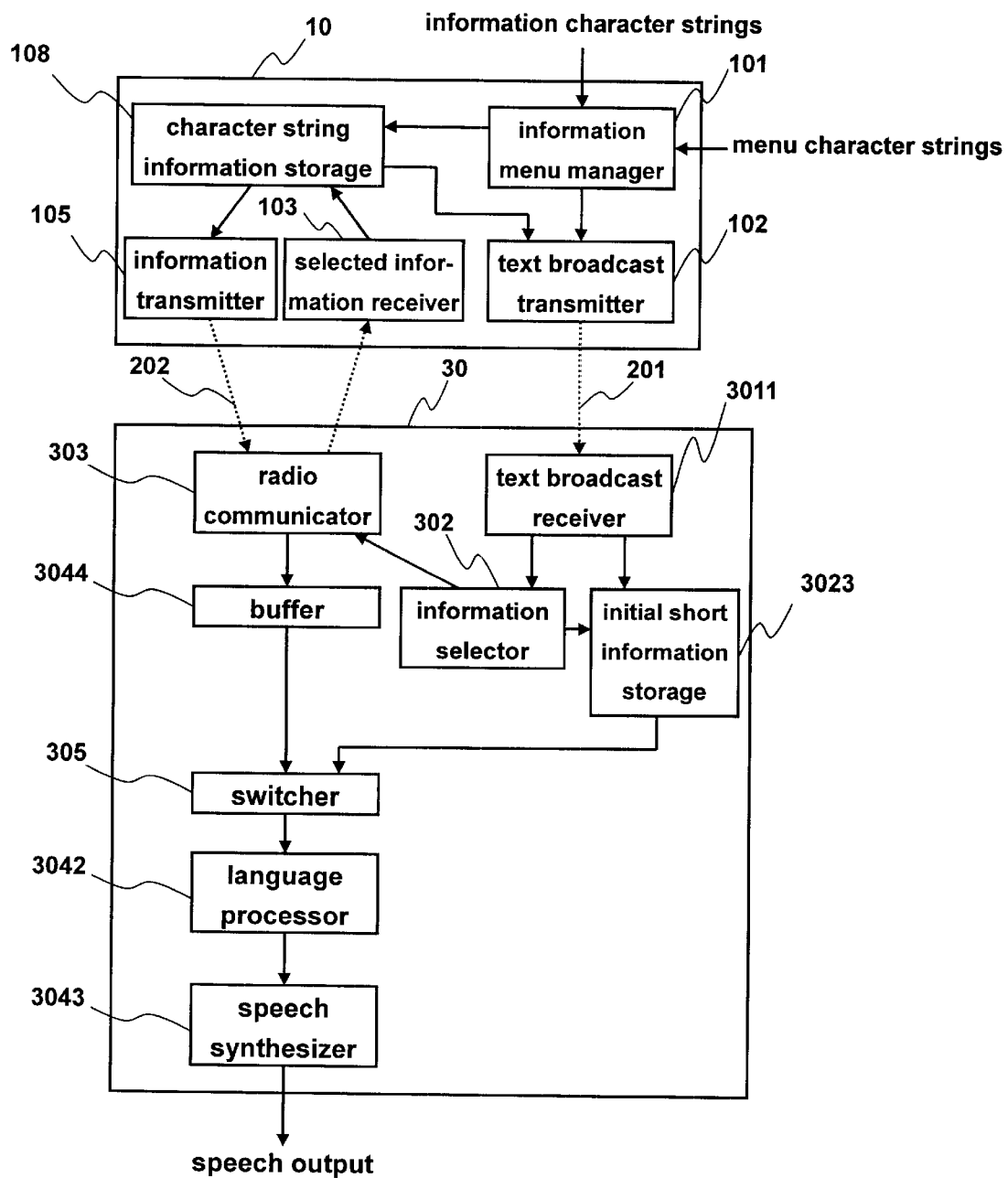
FIG. 17 is a block diagram showing the structure of an information speech system according to Embodiment 9 of the present invention.

FIG. 17 is a block diagram showing the structure of the information speech system according to Embodiment 9 of the present invention.

As shown in FIG. 17, the information speech system in this embodiment includes an information menu manager 101, a text broadcast transmitter 102, a selected-information receiver 103, an information transmitter 105, and a character string information storage 108 on the side of the information station 10.

The mobile terminal 30 in this embodiment includes a text broadcast receiver 3011, an information selector 302, a radio communicator 303, a language processor 3042, a speech synthesizer 3043, a buffer 3044, a switcher 305, and an initial short information storage 3023.

In this embodiment, information is classified into information that is longer than a predetermined length and information that is shorter than the predetermined length. The initial short information storage 3023 stores all the character strings of information when the information is shorter than a predetermined length (hereinafter, referred to as "short information"). On the other hand, the initial short information storage 3023 stores the character strings of the initial part of information when the information is longer than a predetermined length (hereinafter, referred to as "long information").

The structure including the initial short information storage 3023 in the mobile terminal 30 makes a difference in the process procedure of the information station 10 from that in the previous embodiments. More specifically, the information menu manager 101 in this embodiment determines whether each character string information is short information or long information, based on the length of the information character strings, and sets a flag in accordance with the result of the determination.

The text broadcast transmitter 102 transmits menu character strings and IDs, and also obtains the character string information of the initial part of the long information, or all the information character strings of the short information from the character string information storage 108, by referring to the flag. Then, the text broadcast transmitter 102 transmits the information together with the flag via text broadcasting. The menu information in this embodiment includes the character strings of the initial part of the long information, all the character strings of the short information and the flag set for each information, in addition to the menu character strings and the IDs.

Accordingly, the mobile terminal 30 stores the character strings of the initial part of the long information and all the character strings of the short information received via text broadcasting together with the flag in the initial short information storage 3023.

Figure 18:
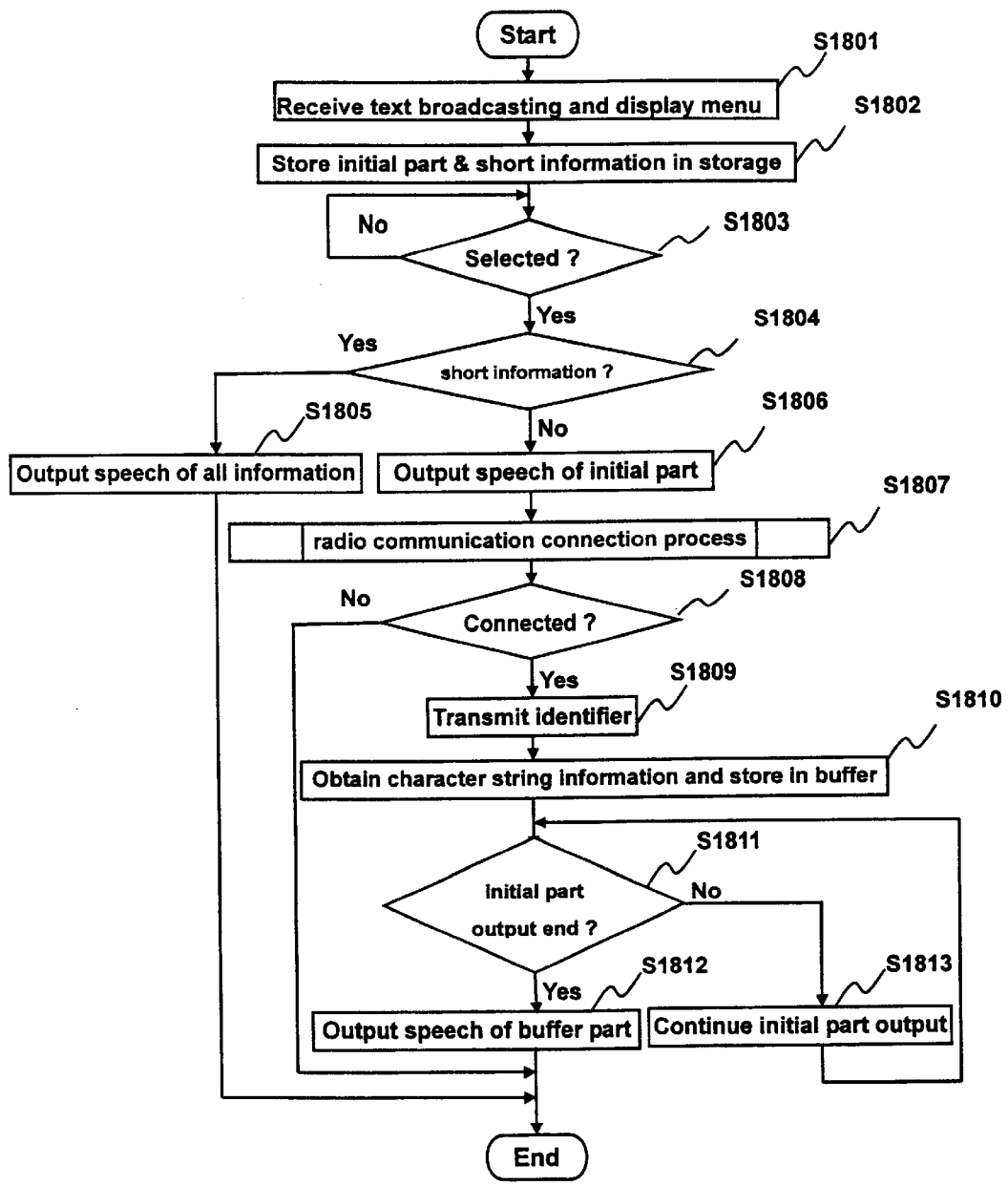
FIG. 18 is a flow chart showing the process procedure of a mobile terminal of Embodiment 9.

FIG. 18 is a flow chart showing the process procedure of the mobile terminal 30 in this embodiment.

The mobile terminal 30 in this embodiment receives text broadcasting so as to display a menu (S1801) and stores the character strings of the initial part of the long information, all the character strings of the short information and the flag transmitted via text broadcasting in the initial short information storage 3023 (S1802).

When the user selects information (S1803: Yes), it is determined whether or not the selected information is short information (S1804).

When the selected information is short information (S1804: Yes), the switcher 305 performs a switching process so that the character strings of the short information stored in the initial short information storage 3023 are output (S1805), the process ends. In this case, it is not necessary to establish radio communication.

When the selected information is long information (S1804: No), the switcher 305 performs a switching process so that the character strings of the initial part of the long information stored in the initial short information storage 3023 start to be output as speech (S1806).

The subsequent processes are the same as the processes from S1205 to S1211 in Embodiment 5, so that they are not further described here.

As described above, the information speech system in this embodiment makes it possible to further reduce the time that the user waits, and makes it unnecessary to establish radio communication with a PHS or the like in the case of short information, because all the character strings are transmitted to the mobile terminal by broadcasting electric waves.

Embodiment 10

Next, a tenth embodiment of the present invention will be described below.

Figure 19:
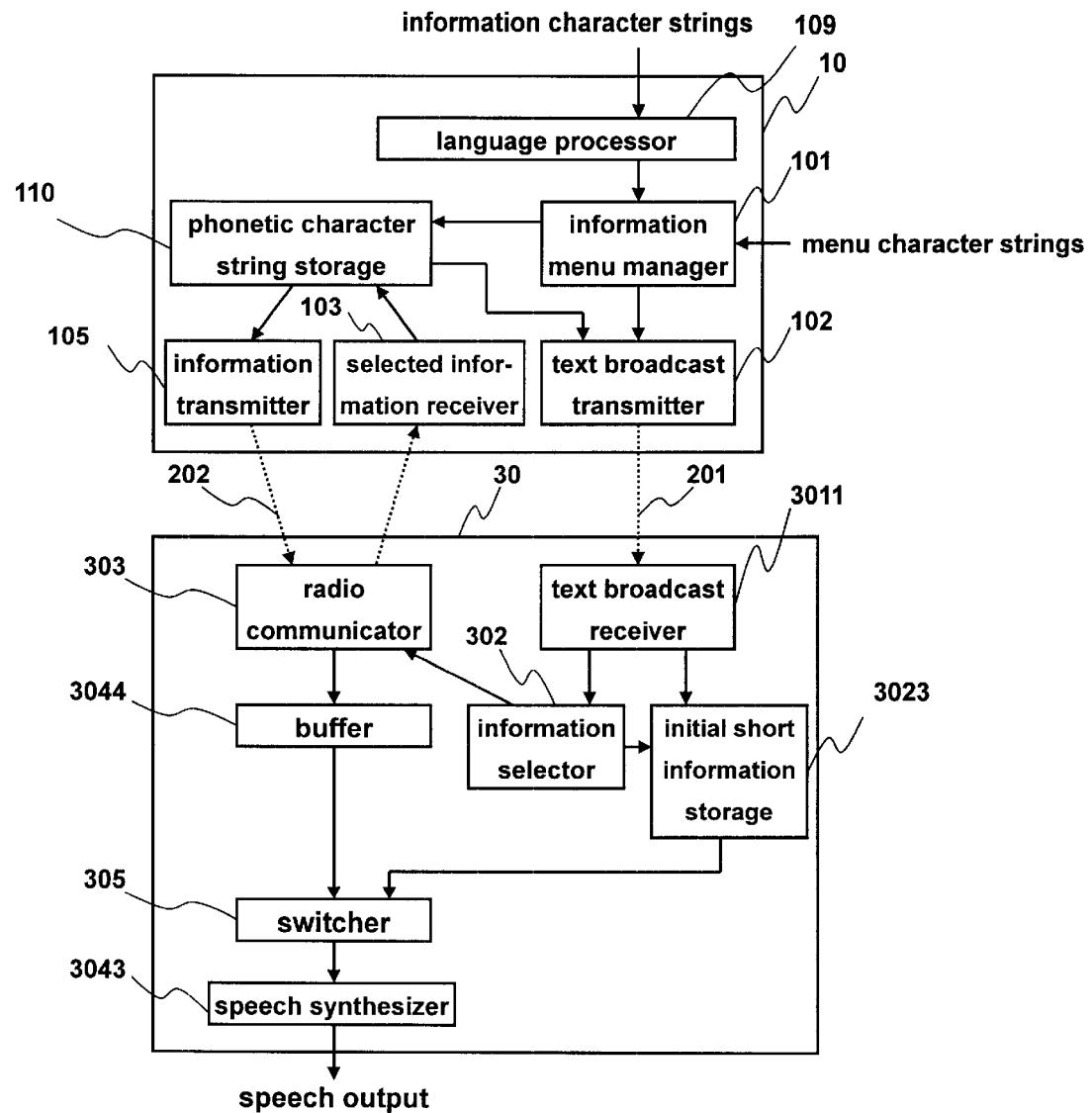
FIG. 19 is a block diagram showing the structure of an information speech system according to Embodiment 10 of the present invention.

FIG. 19 is a block diagram showing the structure of the information speech system according to Embodiment 10 of the present invention.

As shown in FIG. 19, the information speech system in this embodiment includes an information menu manager 101, a text broadcast transmitter 102, a selected-information receiver 103, an information transmitter 105, a language processor 109, and a phonetic character string storage 110 on the side of the information station 10.

The mobile terminal 30 in this embodiment includes a text broadcast receiver 3011, an information selector 302, a radio communicator 303, a speech synthesizer 3043, an initial short information storage 3023, a buffer 3044, and a switcher 305.

The language processor 109 is included in the information station 10 in this embodiment, whereas the language processor 3042 is included in the mobile terminal 30 in Embodiment 9. Furthermore, in this embodiment, the information stored in the information station 10, namely, the information of the initial part (all the information in the case of short information) and the information of other parts than the initial part are stored in the form of phonetic character strings, as in Embodiment 4. Accordingly, the menu information in this embodiment includes the phonetic character strings of the initial part of long information, all the phonetic character strings of short information and the flag indicating whether the information is short or long, in addition to the menu character strings and the IDs.

The process of the mobile terminal 30 in this embodiment is substantially the same as that described with reference to FIG. 18, except that language processing is not necessary in this embodiment, because the phonetic character strings are converted to speech, when outputting the initial part of the information and the information stored in the buffer 3044 in the case of long information, and all the information in the case of short information as speech.

As described above, the information speech system in this embodiment makes it possible to further reduce the time that the user waits for connection, to eliminate the necessity to establish radio communication with a PHS or the like in the case of short information, and facilitates the maintenance of a dictionary for language processing for converting character string information to phonetic character strings.

Embodiment 11

Next, an eleventh embodiment of the present invention will be described below.

Figure 20:
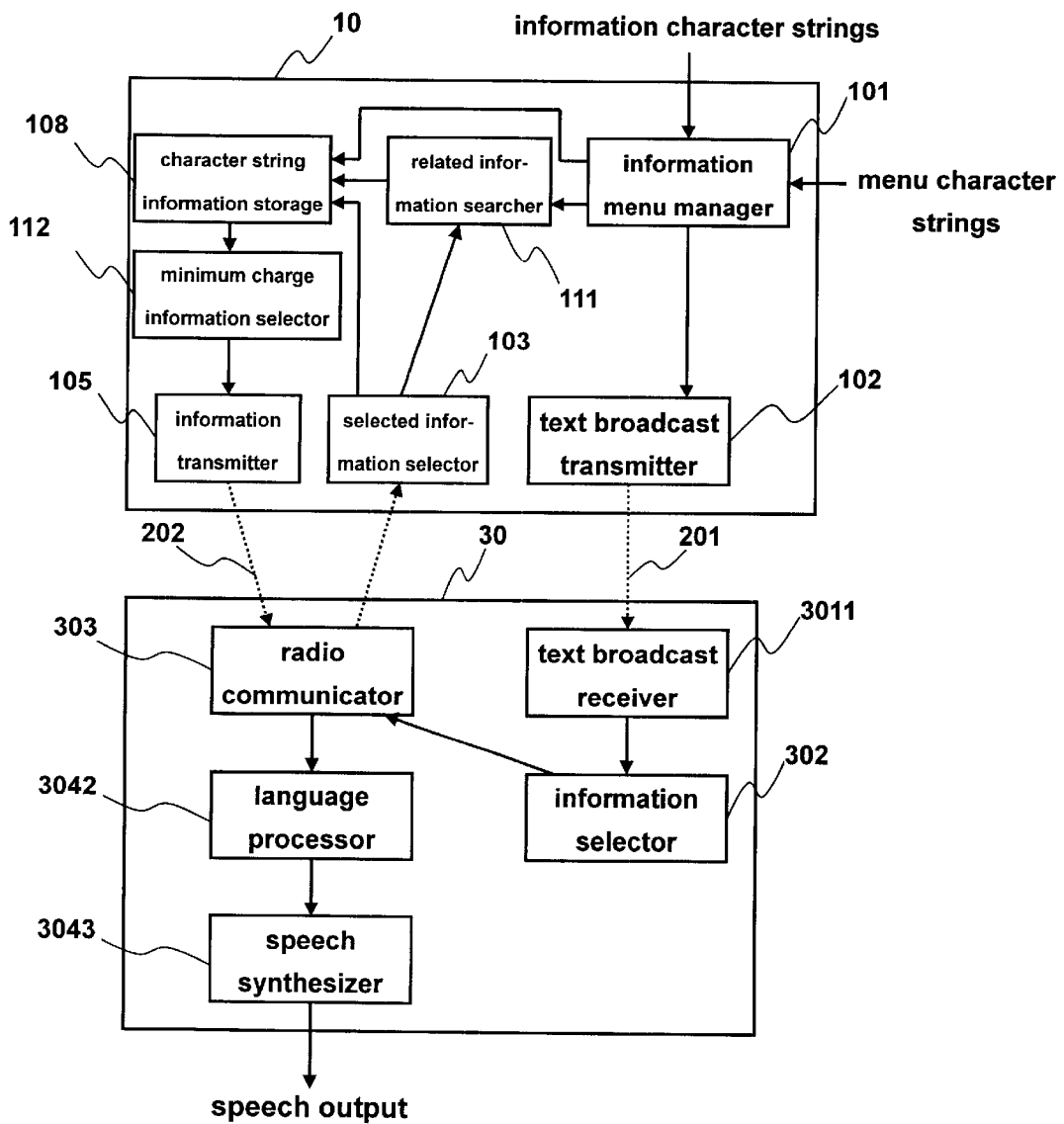
FIG. 20 is a block diagram showing the structure of an information speech system according to Embodiment 11 of the present invention.

FIG. 20 is a block diagram showing the structure of the information speech system according to Embodiment 11 of the present invention.

As shown in FIG. 20, the information speech system in this embodiment includes an information menu manager 101, a text broadcast transmitter 102, a selected-information receiver 103, an information transmitter 105, a character string information storage 108, a related information searcher 111, and a minimum charge information selector 112 on the side of the information station 10.

The mobile terminal 30 in this embodiment includes a text broadcast receiver 3011, an information selector 302, a radio communicator 303, a language processor 3042, and a speech synthesizer 3043.

The related information searcher 111 obtains information indicating a relation between IDs and information (hereinafter, referred to as "relation-indicating information") from information menu manager 101. When the user selects information, the related information searcher 111 searches information including the information related to the ID of the selected information and transmits the ID to the character string information storage 108.

The relation-indicating information is stored in the form of a table indicating the corresponding relationship between the ID of certain information and the ID of the information related to the certain information (hereinafter, referred to as "related information"). The relation-indicating information can be set by a system manager, or can be set automatically, for example by extracting key words in the information menu manager 101. Thus, the related information searcher 111 can search the ID of related information based on the ID of the information selected by the user.

Accordingly, the character string information storage 108 in this embodiment transmits the information selected by the user and the character strings of the related information to the minimum charge information selector 112.

The minimum charge information selector 112 selects news in a range that permits transmission at the minimum charge by the radio communicator such as a PHS from the character strings transmitted from the character string information storage 108, and transmits the news in that range to the mobile terminal 30 via the information transmitter 105.

Figure 21:
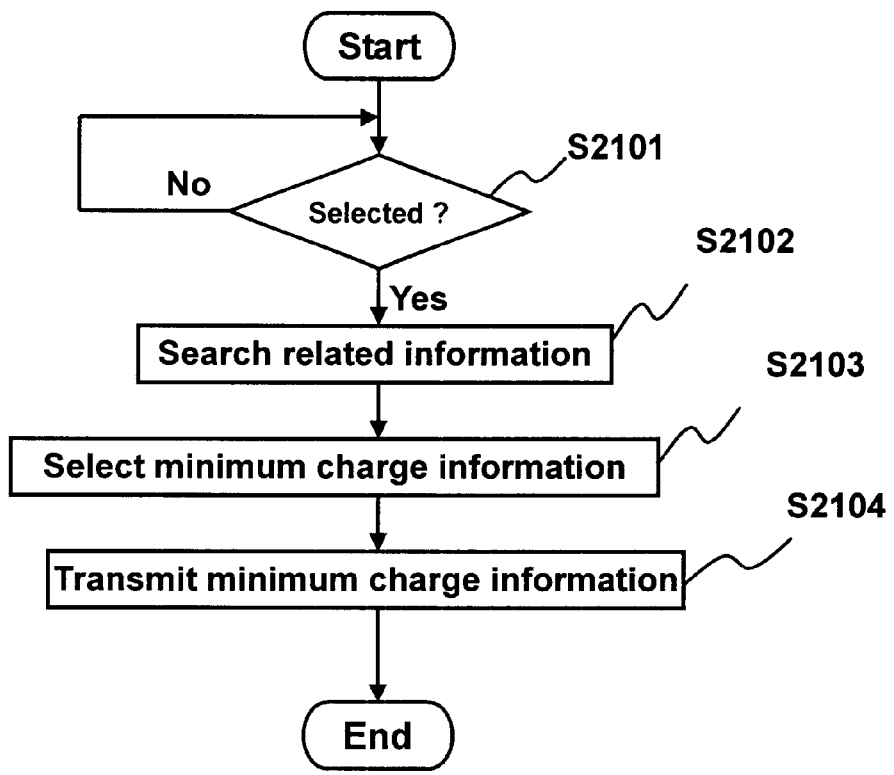
FIG. 21 is a flow chart showing the process procedure of a mobile terminal of Embodiment 11.

FIG. 21 is a flow chart showing the process procedure when the information station 10 in this embodiment receives a selection of information of the user via radio communication with a PHS or the like. The menu information in this embodiment is the same as that in Embodiment 1.

As shown in FIG. 21, when the information station 10 in this embodiment obtains the ID of the information selected by the user (S2101: Yes), related information is searched on the basis of the obtained ID (S2102).

Then, the character strings that can be transmitted at a minimum charge are selected from the selected information and the related information (S2103). In this selection, basically, the selected information has priority over other information, but the criterion for selecting information varies. For example, information having the latest update date or shortest information may be selected.

Furthermore, the information station 10 transmits the selected character strings that can be transmitted at the minimum charge to the mobile terminal 30 via radio communication by a PHS or the like (S2104).

On the other hand, the structure and the process of the mobile terminal 30 in this embodiment are the same as those in Embodiment 3, so that they are not further described here.

As described above, the information speech system in this embodiment makes it possible to reduce the time that the user waits, and to reduce communication costs because related information that the user might be interested in is downloaded at a minimum charge of radio communication, which eliminates the necessity of reconnecting to the network to obtain new related information.

Embodiment 12

Next, a twelfth embodiment of the present invention will be described below.

Figure 22:
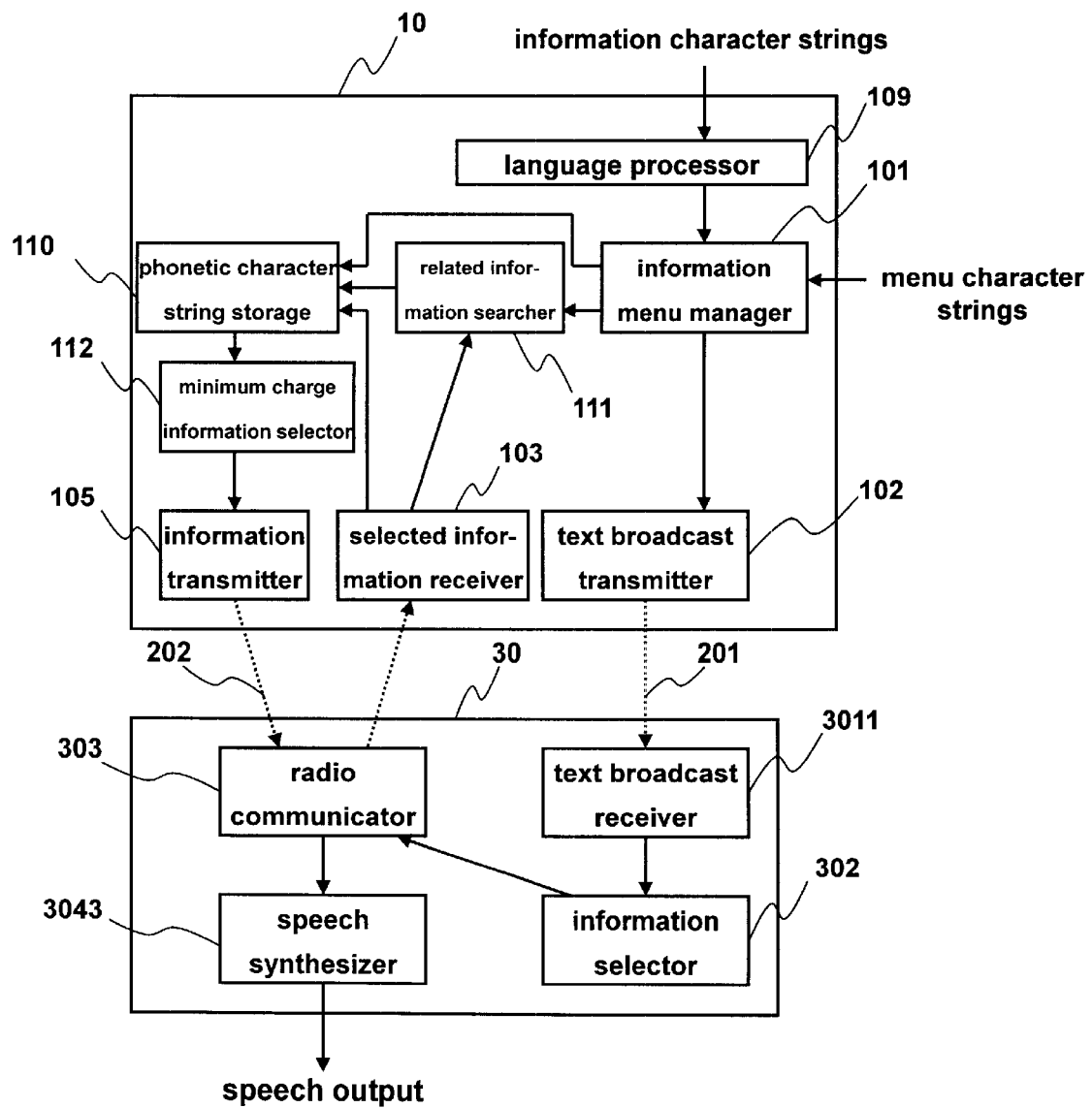
FIG. 22 is a block diagram showing the structure of an information speech system according to Embodiment 12 of the present invention.

FIG. 22 is a block diagram showing the structure of the information speech system according to Embodiment 12 of the present invention.

As shown in FIG. 22, the information speech system in this embodiment includes an information menu manager 101, a text broadcast transmitter 102, a selected-information receiver 103, an information transmitter 105, a phonetic character string storage 110, a related information searcher 111, a minimum charge information selector 112, and a language processor 109 on the side of the information station 10.

On the other hand, the structure and the process of the mobile terminal 30 are the same as those in Embodiment 11, except that the language processor 3042 is excluded from the mobile terminal 30 in this embodiment.

The language processor 109 is included in the information station 10 in the information speech system in this embodiment, whereas the language processor 3042 is included in the mobile terminal 30 in Embodiment 11, so that information is stored in the form of phonetic character strings in the information station 10 in this embodiment. Therefore, the menu information is the same as that in Embodiment 11.

As described above, the information speech system in this embodiment makes it possible to reduce the time that the user waits, to reduce communication costs, and facilitates the maintenance of a dictionary for language processing for converting character string information to phonetic character strings Embodiment 13

Next, a thirteenth embodiment of the present invention will be described below.

Figure 23:
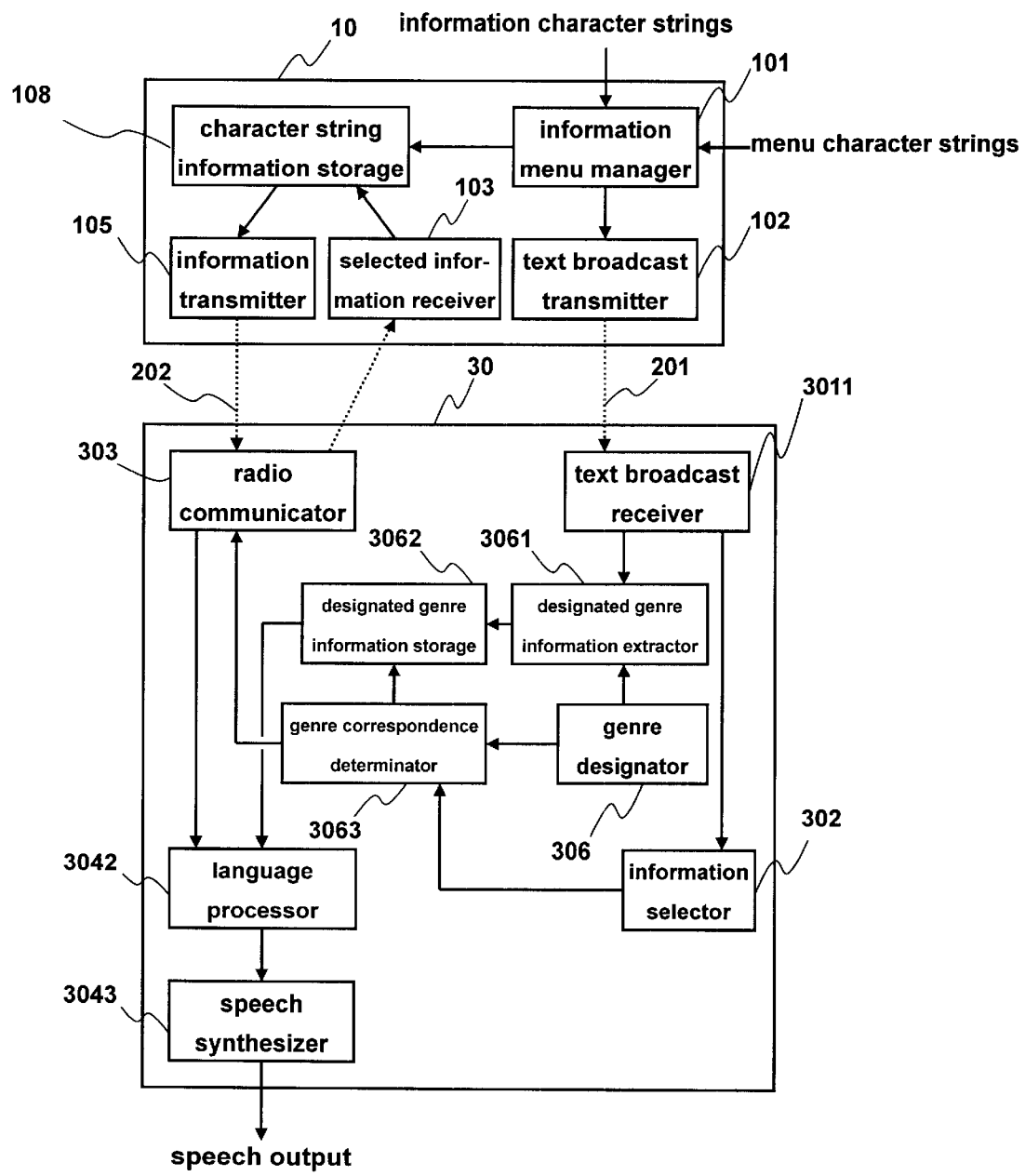
FIG. 23 is a block diagram showing the structure of an information speech system according to Embodiment 13 of the present invention.

FIG. 23 is a block diagram showing the structure of the information speech system according to Embodiment 13 of the present invention.

As shown in FIG. 23, the information speech system in this embodiment includes an information menu manager 101, a text broadcast transmitter 102, a selected-information receiver 103, an information transmitter 105, and a phonetic character string storage 108 on the side of the information station 10.

This embodiment permits the user to designate previously the genre of the information that the user desires to obtain on the side of the mobile terminal 30, as described later. Therefore, the text broadcast transmitter 102 in this embodiment is different from those in the previous embodiments, in that it broadcasts all the character strings of each information in addition to the menu character strings and the IDs as the menu information. Accordingly, the information menu manager 101 transmits all the information character strings with the IDs assigned thereto to the character string information storage 108 and the text broadcast transmitter 102.

The mobile terminal 30 in this embodiment includes a text broadcast receiver 3011, an information selector 302, a radio communicator 303, a language processor 3042, a speech synthesizer 3043, a genre designator 306, a designated genre information extractor 3061, a designated genre information storage 3062 and a genre correspondence determinator 3063.

The genre designator 306 is used to designate the genre of the information that the user desires to obtain, as described above. The genre can be designated before use or can be changed during use.

The designated genre information extractor 3061 extracts the information corresponding to the genre designated by the genre designator 306 (hereinafter referred to as "designated genre") among all the information transmitted via text broadcasting and stores the information to the designated genre information storage 3062. All the text of the information corresponding to the designated genre is stored with the ID as character information in the designated genre information storage 3062.

The genre correspondence determinator 3063 determines whether or not the ID of the information selected by the user via the information selector 302 corresponds to the designated genre. In this embodiment, when the selected information corresponds to the designated genre, all the text of the information can be output as speech without establishing radio communication with a PHS or the like. On the other hand, when the selected information does not correspond to the designated genre, the mobile terminal 30 obtains the information from the information station 10 by establishing radio communication with a PHS or the like. According to the information speech system in this embodiment, since it takes a long time to obtain all information via text broadcasting, the information corresponding to the designated genre is obtained via text broadcasting, for example, by turning on the system beforehand, whereas only the information not corresponding to the designated genre is obtained via radio communication.

Figure 24:
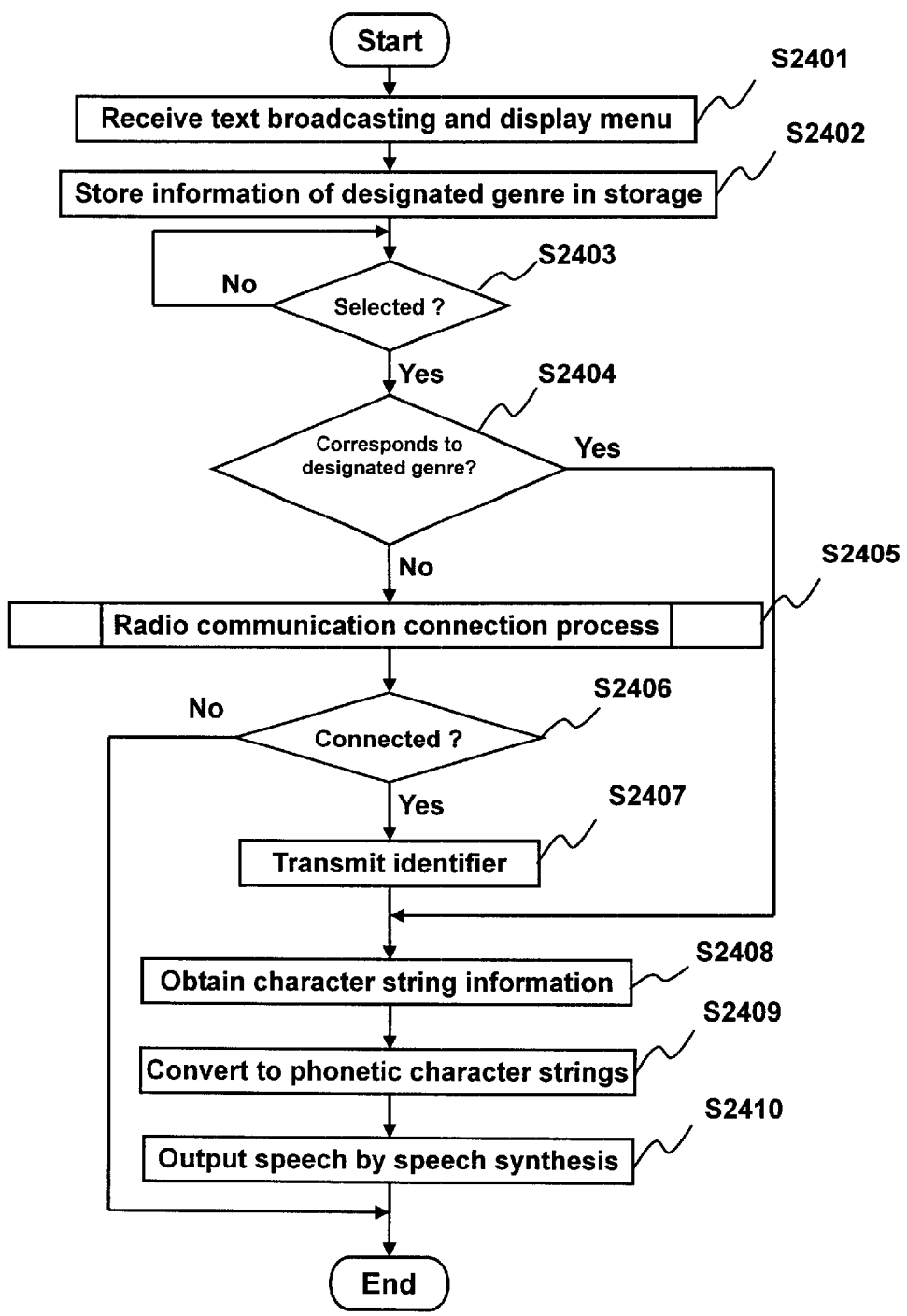
FIG. 24 is a flow chart showing the process procedure of a mobile terminal of Embodiment 13.

FIG. 24 is a flow chart showing the process procedure of the mobile terminal 30 in this embodiment. In this embodiment, text broadcasting is received constantly, and a genre already has been designated.

The mobile terminal 30 in this embodiment receives text broadcasting and displays a menu (S2401), extracts the character strings of the information corresponding to the designated genre among the information transmitted via text broadcasting and stores them in the designated genre information storage 3062 (S2402).

When the user selects information (S2403: Yes), it is determined whether or not the selected information corresponds to the designated genre (S2404). When the selected information corresponds to the designated genre (S2404: Yes), the character string information is obtained from the designated genre information storage 3062 (S2408) and is output as speech without establishing radio communication (S2409 to S2410).

When the selected information does not correspond to the designated genre at S2404 (S2404: No), radio communication is established by a PHS or the like in the same manner as in the previous embodiments (S2405 to S2406) so that the ID is transmitted to the information station 10 (S2407). In this case, the character string information is obtained from the information station 10 via radio communication (S2408) and is output as speech (S2409 to S2410).

As described above, the information speech system in this embodiment allows the information corresponding to the designated genre to be obtained from broadcasting, so that the user can listen to the information without establishing radio communication by previously designating a genre that the user is interested in.

Embodiment 14

Next, a fourteenth embodiment of the present invention will be described below.

Figure 25:
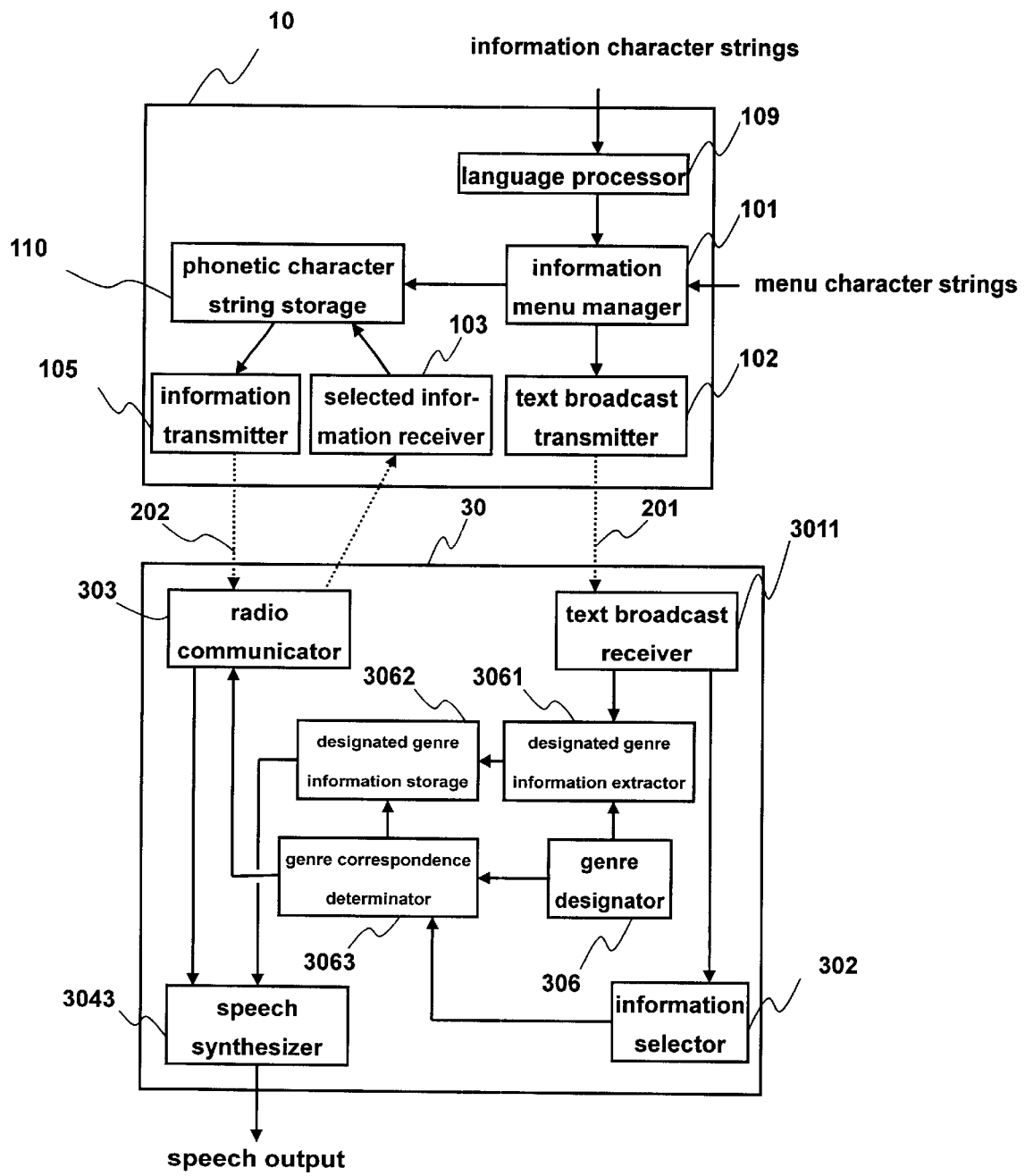
FIG. 25 is a block diagram showing the structure of an information speech system according to Embodiment 14 of the present invention.

FIG. 25 is a block diagram showing the structure of the information speech system according to Embodiment 14 of the present invention.

As shown in FIG. 25, the information speech system in this embodiment includes an information menu manager 101, a text broadcast transmitter 102, a selected-information receiver 103, an information transmitter 105, a language processor 109, and a phonetic character string storage 110 on the side of the information station 10.

On the other hand, the structure of the mobile terminal 30 in this embodiment is the same as that of Embodiment 13, except that the language processor 3042 is not included in the mobile terminal 30 in this embodiment.

In other words, the language processor 109 is included in the information station 10 in the information speech system in this embodiment, whereas the language processor 3042 is included in the mobile terminal 30 in Embodiment 13, so that information is stored in the form of phonetic character strings in the information station 10. Therefore, the menu information in this embodiment includes all the converted phonetic character strings of each information in addition to the menu character strings and the IDs.

As described above, the information speech system in this embodiment makes it possible to listen to information without establishing radio communication by previously designating a genre that the user is interested in, and facilitates the maintenance of a dictionary for language processing for converting character string information to phonetic character strings.

Embodiment 15

Next, a fifteenth embodiment of the present invention will be described below.

Figure 26:
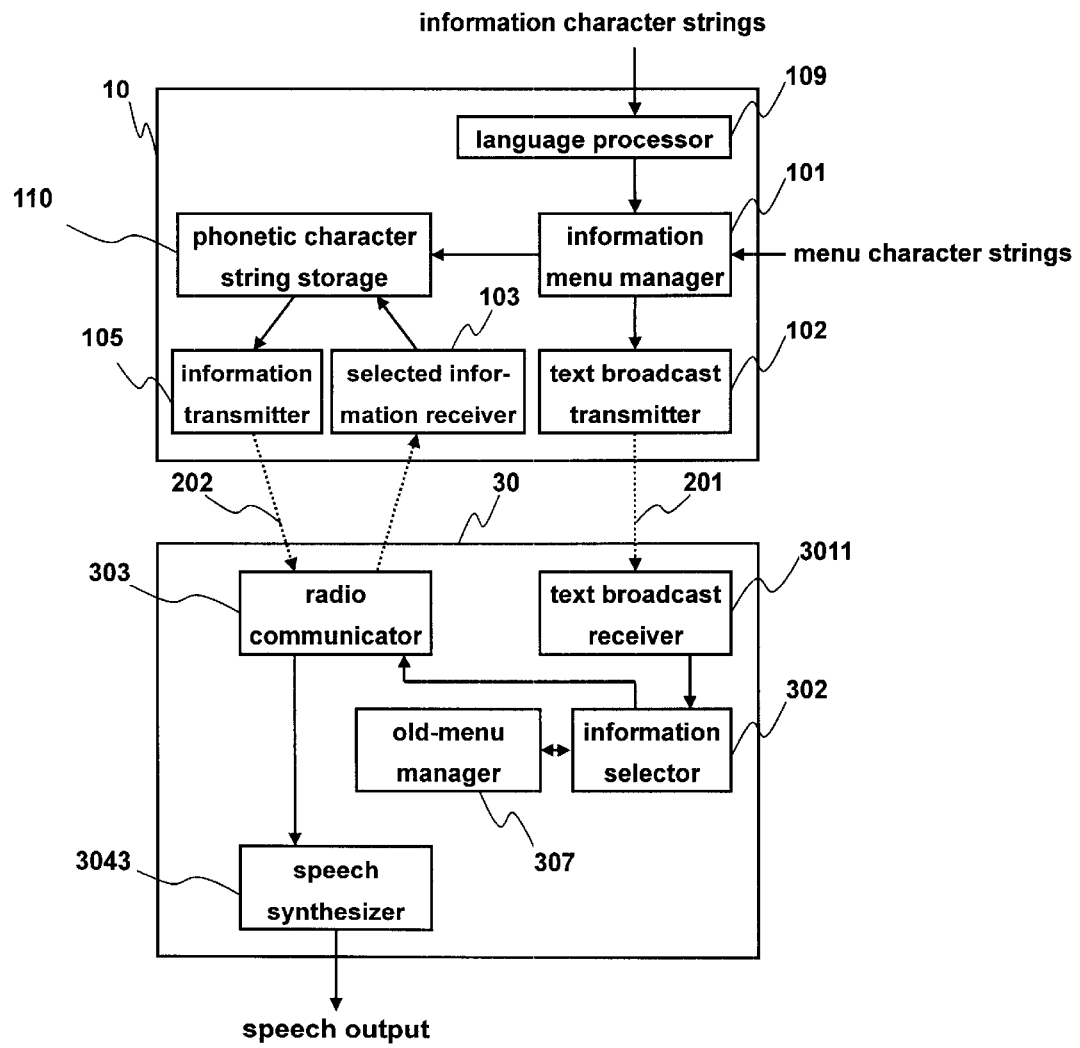
FIG. 26 is a block diagram showing the structure of an information speech system according to Embodiment 15 of the present invention.

FIG. 26 is a block diagram showing the structure of the information speech system according to Embodiment 15 of the present invention.

As shown in FIG. 26, the information speech system in this embodiment includes an information menu manager 101, a text broadcast transmitter 102, a selected-information receiver 103, an information transmitter 105, a language processor 109, and a phonetic character string storage 110 on the side of the information station 10.

On the other hand, the structure of the mobile terminal 30 in this embodiment includes a text broadcast receiver 3011, an information selector 302, a radio communicator 303, a speech synthesizer 3043, and an old-menu manager 307.

The old-menu manager 307 assigns an ID to the menu to be saved, in response to a request to save the menu input by the user via the information selector 302. Then, the old-menu manager 307 stores the menu character strings included in the menu and the ID of the information that can be selected by using the menu together with the ID of the menu. Therefore, in the information speech system in this embodiment, a menu that has been accessed before can be displayed in response to a user's request to display the old menu by using the ID of the menu. Thus, the user can access old news displayed in a menu that has been accessed before.

As described above, the information speech system in this embodiment allows the user to access again old news whose menu is no longer broadcast, because the menu that the user desires to save among the menus accessed before can be stored in the mobile terminal 30.

Embodiment 16

Next, a sixteenth embodiment of the present invention will be described below.

Figure 27:
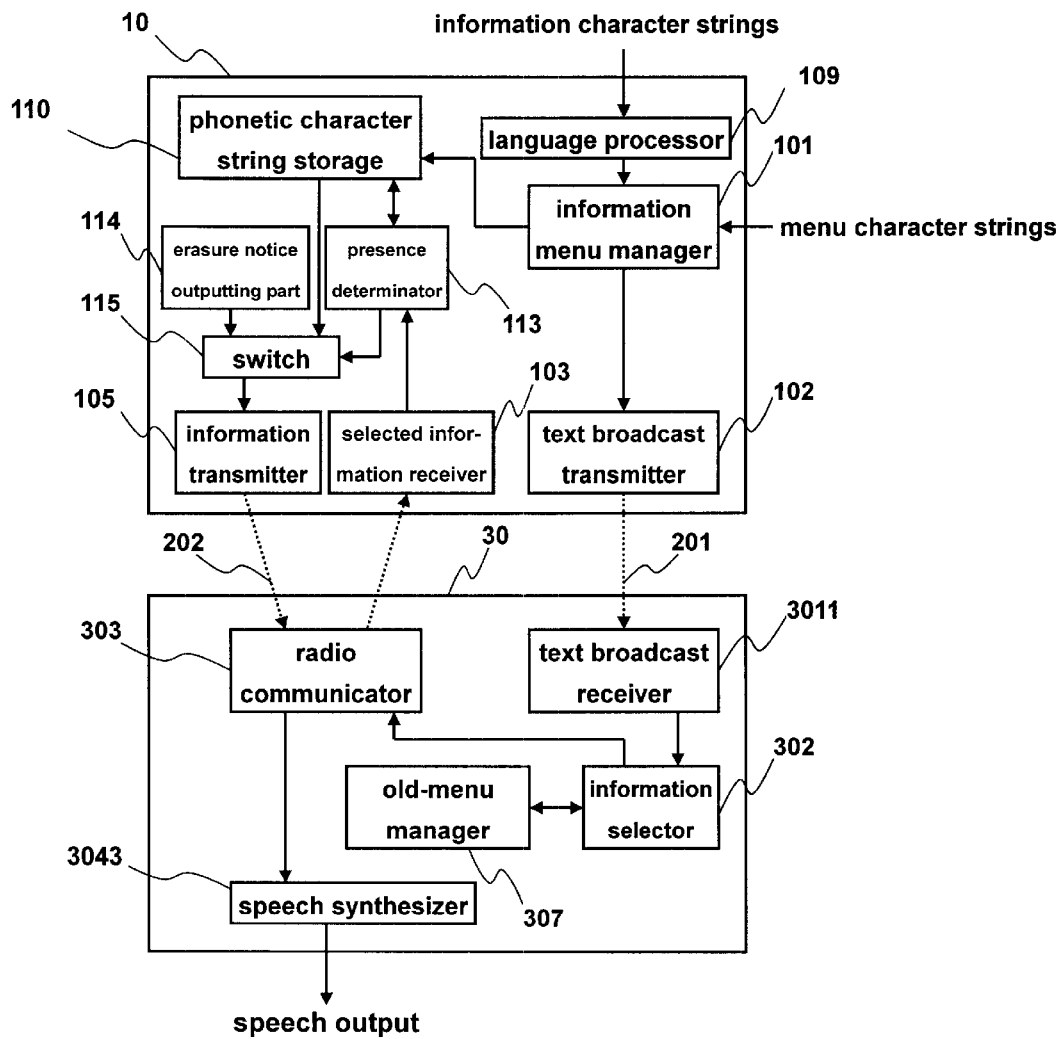
FIG. 27 is a block diagram showing the structure of an information speech system according to Embodiment 16 of the present invention.

FIG. 27 is a block diagram showing the structure of the information speech system according to Embodiment 16 of the present invention.

As shown in FIG. 27, the information speech system in this embodiment includes an information menu manager 101, a text broadcast transmitter 102, a selected-information receiver 103, an information transmitter 105, a language processor 109, a phonetic character string storage 110, a presence determinator 113, an erasure notice outputting part 114, and a switch 115 on the side of the information station 10.

On the other hand, the structure of the mobile terminal 30 in this embodiment includes a text broadcast receiver 3011, an information selector 302, a radio communicator 303, a speech synthesizer 3043, and an old-menu manager 307, as in Embodiment 15.

When the user requests to access old information as described in Embodiment 15, this embodiment allows an appropriate process in the case where the requested information already has been erased in the information station 10.

The presence determinator 113 determines whether or not the information requested by the user is stored in the phonetic character string storage 110, and transmits the result to the switch 115. When the requested information is stored in the phonetic character string storage 110, the requested information is transmitted to the mobile terminal 30. When the requested information is not stored in the phonetic character string storage 110, the switch 115 is switched so that the erasure notice outputting part 114 outputs a notice indicating that the information has been erased to the mobile terminal 30.

Figure 28:
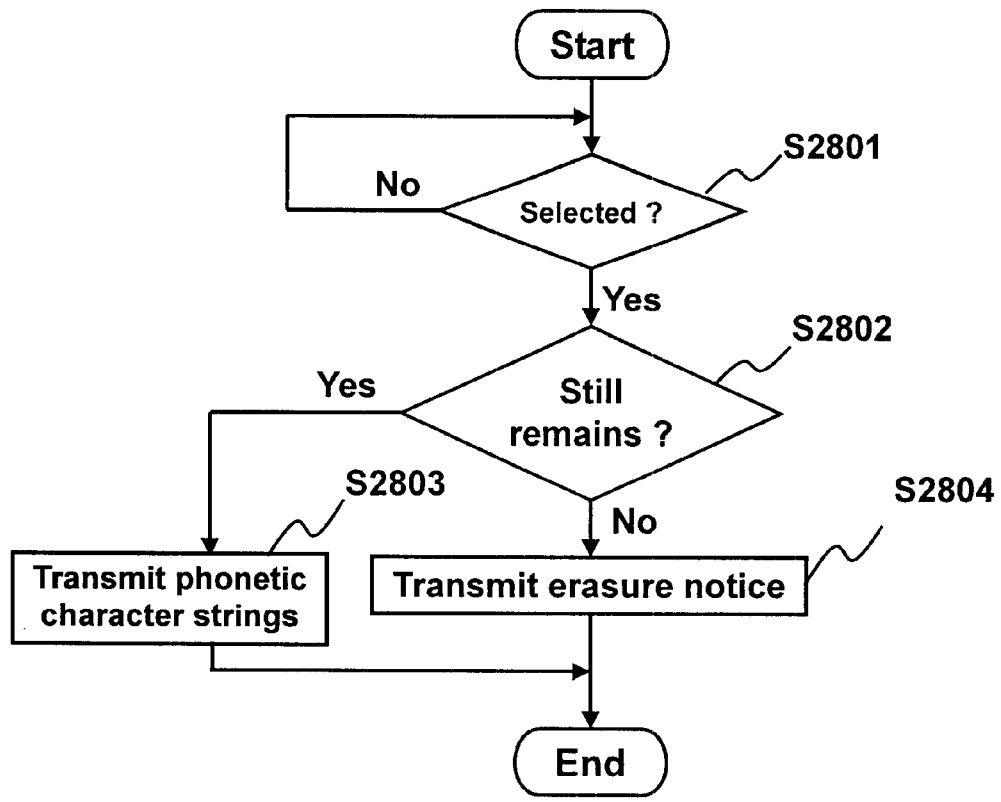
FIG. 28 is a flow chart showing the process procedure of a mobile terminal of Embodiment 16.

FIG. 28 is a flow chart showing the process procedure when the information station 10 in this embodiment receives a selection of information of the user via radio communication with a PHS or the like.

As shown in FIG. 28, when the information station 10 in this embodiment receives the ID of the information selected by the user (S2801: Yes), the presence determinator 113 determines whether or not the information corresponding to the obtained ID is stored in the phonetic character string storage 110 (S2802).

When the corresponding information is still stored (S2802: Yes), the corresponding phonetic character strings stored in the phonetic character string storage 110 are transmitted to the mobile terminal 30. More specifically, in accordance with the determination of the presence determinator 113, the switch 115 is switched so as to activate the phonetic character string storage 110, and the present determinator 113 transmits the ID to the phonetic character string storage 110, so that phonetic character strings can be transmitted to the mobile terminal 30 via the information transmitter 105.

On the other hand, when the corresponding information has been erased and is not stored in the phonetic character string storage 110 (S2802: No), a notice indicating that the information has been erased is transmitted to mobile terminal 30 (S2804). More specifically, in accordance with the determination of the presence determinator 113, the switch 115 is switched so as to activate the erasure notice outputting part 114, so that a notice indicating that the information has been erased can be transmitted to the mobile terminal 30 via the information transmitter 105.

When the notice indicating that the information has been erased is transmitted in the form of phonetic character strings, a message indicating that the information has been erased can be output as speech in the mobile terminal 30.

The structure and the process of the mobile terminal 30 in this embodiment are the same as those described in Embodiment 15, so that they are not further described here.

As described above, the information speech system in this embodiment makes it possible to access old news whose menu has not been broadcast any more, and allows an appropriate process in the case where the old news already has been erased on the side of the information station 10.

In the description of the Embodiments of the present invention, text broadcasting is utilized to broadcast menu information. However, the present invention is not limited to text broadcasting.

Figure 29:
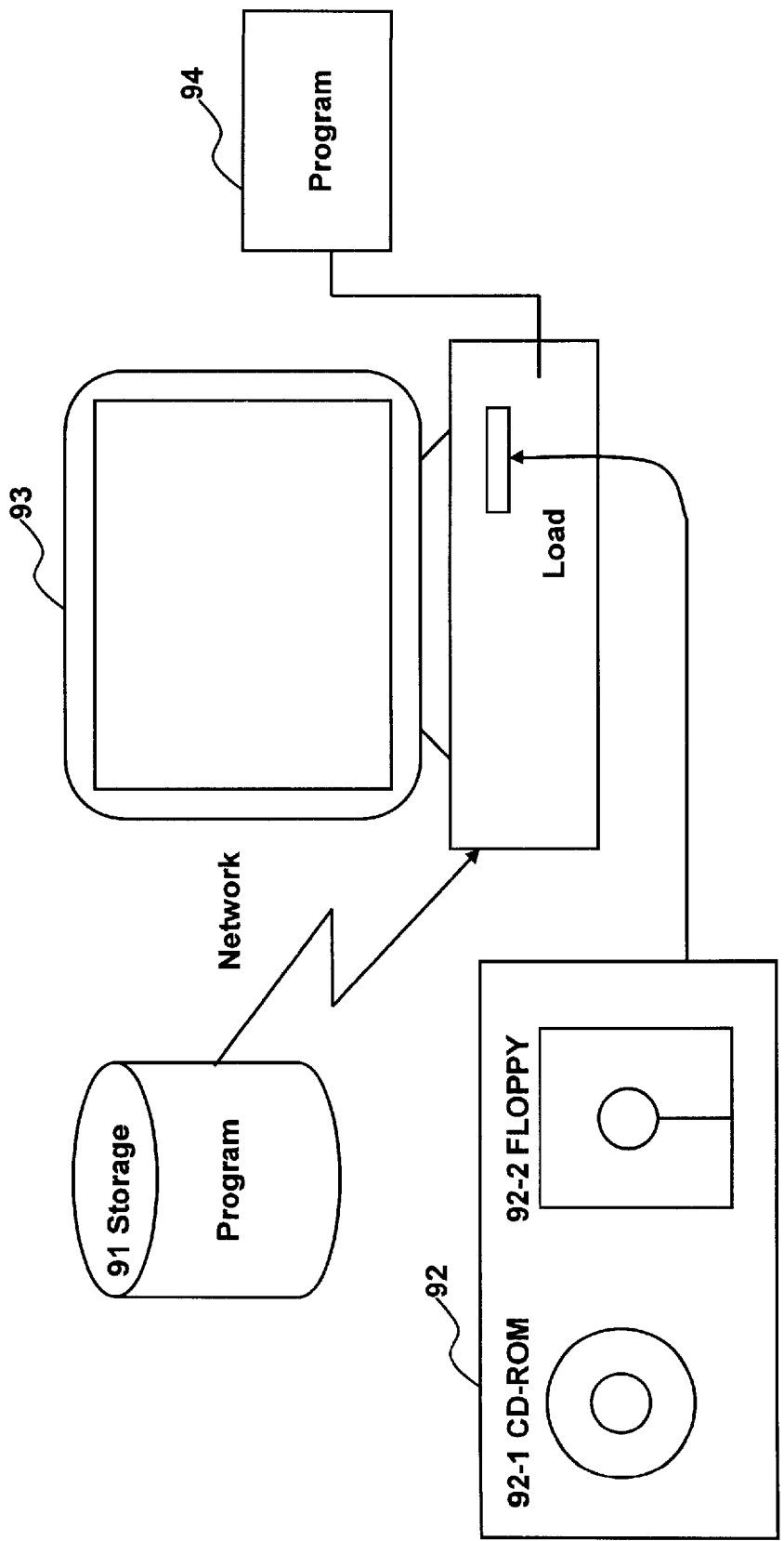
FIG. 29 is a diagram showing an example of a recording medium.

A recording medium in which programs for realizing the information speech system of the present invention are recorded can be not only a transportable recording medium 92 such as a CD-ROM 92-1, or a floppy disk 92-2, but also a remote accessible storage apparatus 91 or an equipped storage medium such as a hard disk and a RAM of a computer, as shown in FIG. 29. The program 94 is loaded into the main memory of a data processing apparatus 93, and executed.

In the present invention, the program that runs on the side of the information station 10 and the program that runs on the side of the mobile terminal 30 may be stored in the same recording medium or separate recording media.

As described above, the information speech system of the present invention makes it possible to reduce the number of times of connecting to the network, and thus reduce the time that the user waits for connection to the network.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An information retrieval system comprising an information terminal and an information station, the information terminal selecting information to be retrieved among information stored in the information station and outputting the retrieved information, comprising:

broadcasting media to broadcast menu information from the information station to the information terminal;

data transmission media to transmit the selected information content, said data transmission media is formed on demand between the information terminal and the information station; and menu information indicating transmittable information by the information station broadcasted from the information station to the information terminal via the broadcasting media;

wherein the information station comprises:

a broadcasting transmitter to broadcast menu information necessary to select information at the information terminal;

a communication receiver to receive communication including data corresponding to selected information from the information terminal; and an information transmitter to transmit the selected information based on the data received by the communication receiver;

wherein the information terminal comprises:

a broadcast receiver to receive broadcasting transmitted by the broadcasting transmitter;

an information selector to allow a user to select information to be obtained by using the menu information included in the broadcasting;

a communicator to communicate data corresponding to the selected information to the information station;

an information receiver to receive the information transmitted by the information transmitter; and a speech output unit to output the information received by the information receiver as speech;

wherein the information content selected by a user of the information terminal by referencing the menu information is retrieved and transmitted from the information station to the information terminal via the data transmission media formed on demand between the information station and the information terminal; and wherein the broadcast transmitter transmits the information including an identifier representing each information, character string information to display contents of each information on a menu, and character string information of an initial part of each information.

2. The information retrieval system according to claim 1, wherein the information terminal further comprises:

an initial part storage to store the character string information of the initial part of each information, such that the speech output unit converts and outputs the character string information stored in the initial part storage as speech prior to reception of information of a part that is not stored in the initial part storage from the information station.

3. The information retrieval system according to claim 2, wherein the information station further comprises:

a converter to convert information from character strings to phonetic character strings to output the character strings as speech, a storage unit to store the phonetic character strings, a broadcast transmitter to transmit the stored phonetic character strings;

an information transmitter to transmit the information in the form of phonetic character strings, and a speech output unit in the information terminal converts the phonetic character strings to speech.

4. The information retrieval system according to claim 1, wherein:

the information to be transmitted by the information transmitter is classified into long information that is longer than a predetermined length and short information that is shorter than the predetermined length such that character string information of an initial part of the long information is extracted as initial short information; and the broadcast transmitter transmits the information including menu character strings, an identifier representing each information, all of the information character strings of the short information, and the character string information of the initial short information as the menu information.

5. The information retrieval system according to claim 4 wherein the information terminal further comprises:

an initial short information storage to store the transmitted short information and the initial short information; and a switcher to detect the selected information by the user stored as the initial short information or as the short information in the initial short information storage, wherein if the selected information is stored as the initial short information, the switcher selects the initial short information and the speech output unit outputs the initial short information content as speech and the communicator transmits a request to transmit the selected information to the information station, or if the selected information is stored as the short information, the switcher selects the short information and the speech output unit outputs the short information content as speech and the communicator does not transmit a request to transmit the selected information to the information station.

6. The information retrieval system according to claim 1, wherein the information station further comprises:

a related information searcher to search information related to the selected information by the information terminal user;

a minimum charge information selector to select information among the related information searched by the related information searcher wherein selected information can be sent via the data transmission media within a minimum charge; and an information transmitter to transmit the information received via the data transmission media.

7. The information retrieval system according to claim 1, wherein the information terminal further comprises:

a genre designator to designate the genre of information desired to be obtained; and a designation genre information storage stores genre information designated by the user via the genre designator selectively from among the information included in the menu information received by the broadcast receiver such that the broadcast transmitter broadcasts the menu information via the broadcasting media, wherein the menu information includes corresponding entire information contents;

wherein if the information selected by the information terminal user is stored in the designation genre information storage, the retrieved information is read from the designation genre information storage and the communicator does not send the data transmission request to the information station, or if the information selected by the information terminal user is not stored in the designation genre information storage, the communicator sends the data transmission request regarding the selected information to the information station.

8. The information retrieval system according to claim 1, wherein the information terminal further comprises:

an old menu manager to assign an ID to the menu to be saved in response to a request from the user to save the menu, and to store the menu character strings included in the menu and the ID of the information that can be selected by using the menu together with the ID of the menu as an old menu information such that the information terminal user can select the desired information from the old menu stored in the old menu manager even after currently transmitted menu information is renewed.

9. The information retrieval system according to claim 8, wherein the information transmitter transmits the information selected to the information terminal by using the old menu.

10. An information retrieval method utilizing an information terminal and an information station, the information terminal selecting information to be retrieved among information stored in the information station and outputting the retrieved information, the method comprising:

provinding broadcasting media to broadcast menu information from the information station to the information terminal;

providing data transmission media to transmit selected information content wherein the data transmission media is formed on demand between the information terminal and the information station;

broadcasting menu information indicating transmittable information by the information station to the information terminal via the broadcasting media; and retrieving and transmitting selected information content between the information station and the information terminal by referencing the menu information from the information station via the data transmission media formed on demand between the information station and the information terminal, wherein the broadcasting menu information includes broadcasting an identifier representing each information, character string information to display contents of each information on a menu, and character string information of an initial part of each information.

11. A computer program realizing an information terminal for use in an information speech system realizing an information terminal and a remote information station, the information terminal selecting information to be obtained among information stored in the remote information station and outputting the obtained information as speech, the program comprising the steps of:

providing broadcasting media to broadcast menu information from the information station to the information terminal;

providing data transmission media to transmit selected information content wherein the data transmission media is formed on demand between the information terminal and the information station;

broadcasting menu information indicating transmittable information from the information station to the information terminal via the broadcasting media; and retrieving and transmitting selected information content between the information station and the information terminal by referencing the menu information from the information station via the data transmission media formed on demand between the information station and the information terminal, wherein the broadcasting menu information includes broadcasting an identifier representing each information, character string information to display contents of each information on a menu, and character string information of an initial part of each information.

* * * * *